(12) United States Patent
Yang et al.

(10) Patent No.: US 9,054,929 B2
(45) Date of Patent: Jun. 9, 2015

(54) CONSTRUCTING VERY HIGH THROUGHPUT SIGNAL (VHT-SIG) FIELDS FOR REDUCED PEAK-TO-AVERAGE POWER RATIO (PAPR)

(75) Inventors: Lin Yang, San Diego, CA (US); Vincent Knowles Jones, IV, Redwood City, CA (US); Albert Van Zelst, Woerden (NL); Hemanth Sampath, San Diego, CA (US); Didier Johannes Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/206,343

(22) Filed: Aug. 9, 2011

(65) Prior Publication Data
US 2012/0039198 A1    Feb. 16, 2012

Related U.S. Application Data

(60) Provisional application No. 61/373,790, filed on Aug. 11, 2010, provisional application No. 61/385,390, filed on Sep. 22, 2010, provisional application No. 61/390,543, filed on Oct. 6, 2010, provisional application No. 61/406,903, filed on Oct. 26, 2010, provisional application No. 61/419,652, filed on Dec. 3, 2010.

(51) Int. Cl.
| | |
|---|---|
| *H04W 52/02* | (2009.01) |
| *H04W 24/00* | (2009.01) |
| *H04W 4/00* | (2009.01) |
| *H04L 27/26* | (2006.01) |

(52) U.S. Cl.
CPC ................................. *H04L 27/2615* (2013.01)

(58) Field of Classification Search
USPC .......................................................... 370/252
See application file for complete search history.

(56) References Cited

U.S. PATENT DOCUMENTS

| | | | |
|---|---|---|---|
| 5,796,774 A | 8/1998 | Kato | |
| 8,340,216 B2 | 12/2012 | Schotten et al. | |
| 2002/0172184 A1* | 11/2002 | Kim et al. | 370/344 |
| 2005/0089116 A1* | 4/2005 | Moffatt et al. | 375/295 |
| 2006/0120269 A1* | 6/2006 | Kim et al. | 370/208 |
| 2006/0140296 A1* | 6/2006 | Cleveland et al. | 375/260 |
| 2007/0133804 A1* | 6/2007 | Kasher | 380/270 |

(Continued)

FOREIGN PATENT DOCUMENTS

| | | |
|---|---|---|
| EP | 0341801 A2 * | 11/1989 |
| JP | H08293818 A | 11/1996 |

(Continued)

OTHER PUBLICATIONS

Van Waes, "IEEE 802.16 Broadband Wireless Access Working Group: OFDM Based 802.16 PHY Proposal," [Online] 2001, pp. 1-13. Retrieved from http://www.ieee802.org/16/tg3/contrib/802163c-01__10r2.pdf.

(Continued)

*Primary Examiner* — Hassan Kizou
*Assistant Examiner* — Tejis Daya
(74) *Attorney, Agent, or Firm* — Patterson & Sheridan, L.L.P.

(57) ABSTRACT

Certain aspects of the present disclosure relate to techniques for constructing a VHT-SIG field of a transmission preamble in a manner that may reduce peak-to-average power ratio (PAPR) of the transmission.

40 Claims, 34 Drawing Sheets

(56) References Cited

U.S. PATENT DOCUMENTS

| | | | |
|---|---|---|---|
| 2009/0031185 | A1 | 1/2009 | Xhafa et al. |
| 2009/0190039 | A1* | 7/2009 | Yun et al. ............... 348/724 |
| 2009/0202008 | A1 | 8/2009 | Suzuki |
| 2009/0310692 | A1 | 12/2009 | Kafle et al. |
| 2010/0309834 | A1* | 12/2010 | Fischer et al. ............ 370/312 |
| 2011/0002219 | A1* | 1/2011 | Kim et al. ............... 370/203 |
| 2011/0096797 | A1 | 4/2011 | Zhang et al. |
| 2011/0110348 | A1 | 5/2011 | Lee et al. |
| 2011/0128947 | A1* | 6/2011 | Liu et al. ............... 370/338 |

FOREIGN PATENT DOCUMENTS

| | | |
|---|---|---|
| JP | 2008118687 A | 5/2008 |
| WO | WO-03034674 A1 | 4/2003 |
| WO | WO-2006102252 A1 | 9/2006 |
| WO | WO-2007125591 A1 | 11/2007 |
| WO | WO-2010117816 A1 | 10/2010 |

OTHER PUBLICATIONS

"IEEE P802.11 Wireless LANs: Specification Framework for TGac" [Online] 2011, pp. 1-50. Retrieved from https://mentor.ieee.org/802.11/dcn/09/11-09-0992-21-00ac-proposed-specification-framework-for-tgac.doc.

Hemanth Sampath, et al.,"802.11ac Preamble" (Jul. 13, 2010) pp. 1-18, Retrieved Aug. 31, 2011 from the Internet https/mentorieee.org/802.11.dcb.10/11-10-0876-00-00ac-11ac-preamble.pptx.

Ardash B. Narasimhamurthy, et al, "OFDM Systems for Wireless Communications," (Mar. 10, 2010), Morgan & Claypool Publishers, pp. 32, line 14 and 16.

PCT Search Report and Written Opinion for PCT/US11/047256, dated Nov. 21, 2011.

Lanante L, et al., "IEEE802.11ac Preamble with Legacy 802.11a/n Backward Compatibility, IEEE 802.11-YY/0847R0, [Online] Jul. 14, 2009, pp. 1-18, XP002606794, Retrieved from the Internet: URL:http://www.google.de/url"sa=t&source=web&cd=3 &ved=0CBgQFjAC&url=https%3A%2F% 2Fmentor.ieee.org%2F802.11%2Fdcn%2F10%2F11-10-0791-02-00ac-pha se-rotation-for-the-80-mhz-802-11ac-mixed-mode-packet.ppt &ei=u3bFT07TE8qh4QbZko26Aw &usg=AFQjCNHYliVI8HNnsZmesHd33saVGqWp0 w> [retrieved on Oct. 25, 2010] pp. 3-12.

Butt U L ., et al., "A Study on the Tone-Reservation Technique for Peak-to-Average Power Ratio Reduction in OFDM Systems", Jan. 1, 2008, Dissertation.com, ISBN: 159942360X, pp. 28-31.

European Search Report—EP14177026—Search Authority—Berlin—Jan. 20, 2015.

Sampath H., et al., "802.11ac Preamble", Internet Citation, Jul. 13, 2010, pp. 1-18, XP002657958, Retrieved from the Internet: URL:https://mentor.ieee.org/802.11/dcn/10/11-10-0876-00-00ac-llac-preamble.pptx.

* cited by examiner

| Bit Index | Field | SU Value | SU bit allocation | Description |
|---|---|---|---|---|
| 0-1 | BW | 00 | 2 | Allows 20,40,80,80+80 and 160 MHz modes. Other modes TBD. Set to 0 for 20 MHz, 1 for 40 MHz, 2 for 80 MHz, 3 for 160 MHz or 80+80 MHz mode If MSB is not used, make it reserved and set to 1 |
| 2 | STBC | 0 | 1 | No STBC |
| 3-8 | Group ID | 111111 | 6 | Single user transmission |
| 9-20 | $N_{STS}$ | 000, 0000000000 | 12 | Single Spatial Stream, sent from AP |
| 21-23 | Reserved | 111 | 3 | All ones |

FIG. 6

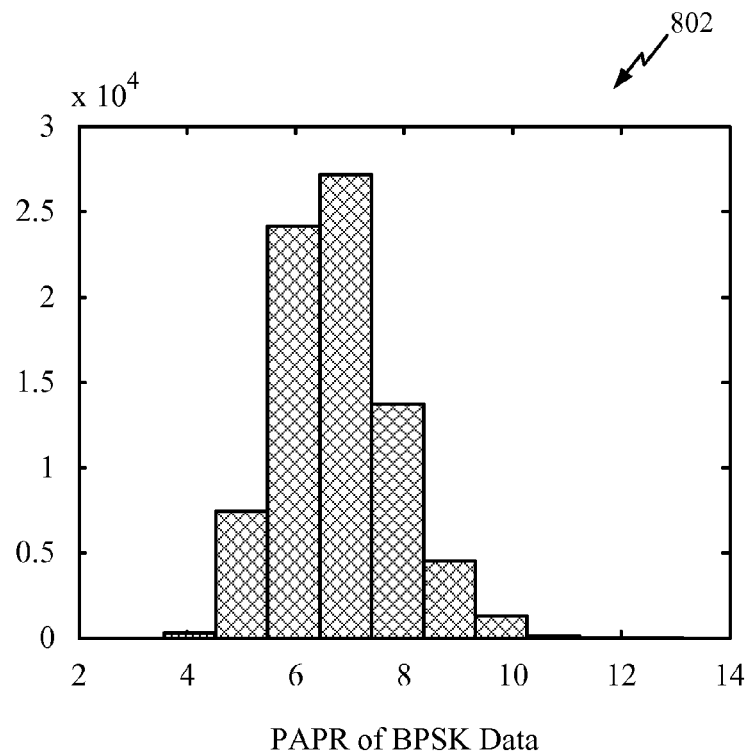
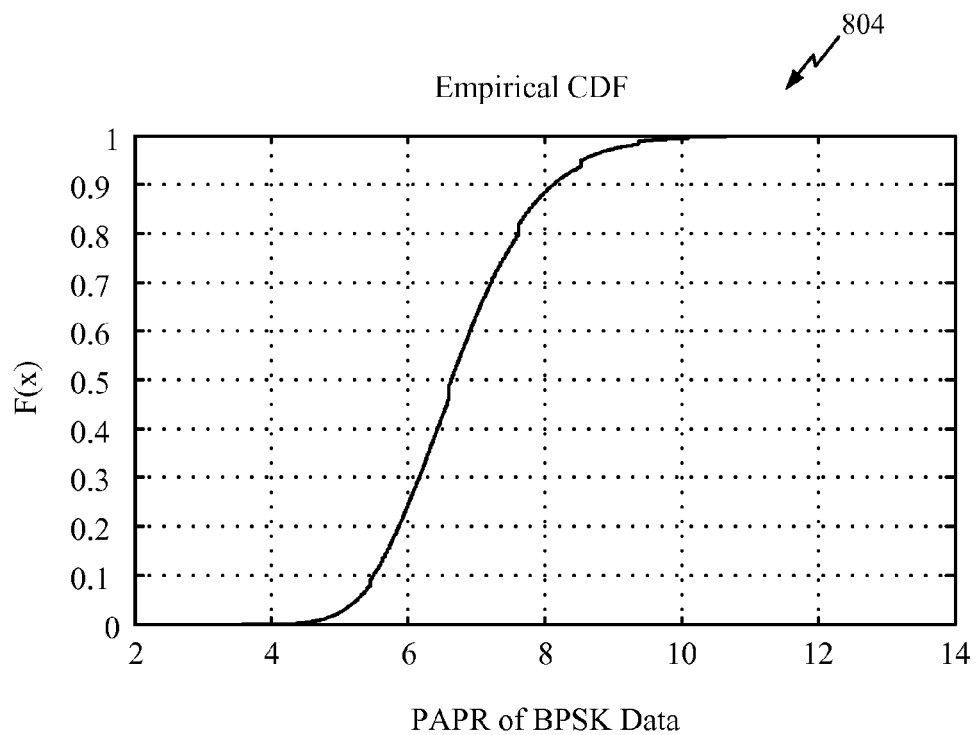
FIG. 8

AID Selection Results for M-BSS with PS 
(min. of worst case PAPR)

| Max(PAPR) (dB) | AID sequence in VHTSIGA (LSB first) | AID values reserved for STA-AP |
|---|---|---|
| 10.4334 | 0 0 0 0 1 1 0 1 0 | 176, 688, 1200, and 1712 |
| 10.5558 | 0 0 1 0 1 0 0 1 0 | 148, 660, 1172, and 1684 |
| 10.6718 | 0 0 0 1 0 0 1 1 1 | 456, 968, 1480, and 1992 |
| 10.7120 | 1 0 0 1 1 0 1 0 1 | 345, 857, 1369, and 1881 |
| 10.8276 | 1 0 0 0 1 1 1 1 0 | 241, 753, 1265, and 1777 |
| 10.8675 | 0 0 1 0 1 0 0 1 1 | 404, 916, 1428, and 1940 |
| 10.8695 | 0 0 0 1 1 0 0 0 0 | 24, 536, 1048, and 1560 |
| 10.9091 | 0 1 1 1 1 1 1 0 0 | 126, 638, 1150, and 1662 |
| 10.9310 | 0 0 1 1 1 1 0 0 0 | 60, 572, 1084, and 1596 |
| 10.9822 | 1 1 0 1 0 1 1 1 1 | 491, 1003, and 1515 |
| 10.9847 | 0 1 1 1 1 1 1 0 1 | 382, 894, 1406, and 1918 |
| 10.9850 | 0 1 0 1 0 0 1 0 1 | 330, 842, 1354, and 1866 |
| 11.0186 | 0 1 0 1 0 0 0 1 0 | 138, 650, 1162, and 1674 |
| 11.0230 | 1 0 0 1 0 0 1 0 1 | 329, 841, 1353, and 1865 |
| 11.0519 | 1 1 0 1 1 1 1 0 1 | 379, 891, 1403, and 1915 |
| 11.0520 | 0 1 1 1 1 1 0 1 1 | 446, 958, 1470, and 1982 |

AID Selection Results for M-BSS with PS (min. of average PAPR) 1000

| Mean(PAPR) (dB) | AID sequence in VHTSIGA (LSB first) | AID values reserved for STA-AP |
|---|---|---|
| 8.3487 | 1 0 0 1 0 0 0 1 0 | 137, 649, 1161, and 1673 |
| 8.3912 | 1 0 0 1 0 1 1 0 0 | 105, 617, 1129, and 1641 |
| 8.4318 | 0 1 1 0 0 0 0 0 0 | 6, 518, 1030, and 1542 |
| 8.4325 | 0 0 1 0 1 0 0 1 1 | 404, 916, 1428, and 1940 |
| 8.4413 | 0 0 1 1 1 1 1 0 0 | 124, 636, 1148, and 1660 |
| 8.4442 | 1 0 0 1 0 1 1 0 1 | 361, 873, 1385, and 1897 |
| 8.4518 | 0 0 0 1 0 1 1 0 0 | 104, 616, 1128, and 1640 |
| 8.4527 | 1 0 0 0 1 0 1 1 0 | 209, 721, 1233, and 1745 |
| 8.4528 | 1 0 1 1 1 1 0 1 0 | 189, 701, 1213, and 1725 |
| 8.4535 | 0 0 0 0 1 1 0 1 0 | 176, 688, 1200, and 1712 |
| 8.4541 | 0 0 1 1 0 1 1 0 1 | 364, 876, 1388, and 1900 |
| 8.4557 | 0 1 1 0 1 1 0 0 0 | 54, 566, 1078, and 1590 |
| 8.4578 | 0 0 0 0 0 0 0 0 1 | 256, 768, 1280, and 1792 |
| 8.4737 | 0 0 1 1 1 1 1 1 1 | 508, 1020, and 1532 |
| 8.4759 | 1 1 0 0 1 0 0 0 1 | 275, 787, 1299, and 1811 |
| 8.4771 | 0 1 0 1 0 0 1 0 1 | 330, 842, 1354, and 1866 |

FIG. 10

AID Selection Results for M-BSS with PS 
(min. of sum(max and mean))

| mean+max(PAPR) (dB) | AID sequence in VHTSIGA (LSB first) | AID values reserved for STA-AP |
|---|---|---|
| 18.8869 | 0 0 0 0 1 1 0 1 0 | 176, 688, 1200, and 1712 |
| 19.0875 | 0 0 1 0 1 0 0 1 0 | 148, 660, 1172, and 1684 |
| 19.3000 | 0 0 1 0 1 0 0 1 1 | 404, 916, 1428, and 1940 |
| 19.3287 | 0 0 0 1 0 0 1 1 1 | 456, 968, 1480, and 1992 |
| 19.4001 | 1 0 0 1 1 0 1 0 1 | 345, 857, 1369, and 1881 |
| 19.4620 | 0 1 0 1 0 0 1 0 1 | 330, 842, 1354, and 1866 |
| 19.4674 | 1 0 0 1 0 0 0 1 0 | 137, 649, 1161, and 1673 |
| 19.5093 | 1 0 0 0 1 1 1 1 0 | 241, 753, 1265, and 1777 |
| 19.5300 | 0 0 1 1 1 1 0 0 0 | 60, 572, 1084, and 1596 |
| 19.5366 | 0 0 0 1 1 0 0 0 0 | 24, 536, 1048, and 1560 |
| 19.5647 | 0 1 1 1 1 1 1 0 0 | 126, 638, 1150, and 1662 |
| 19.5879 | 0 0 1 1 1 1 1 0 0 | 124, 636, 1148, and 1660 |
| 19.6314 | 1 1 1 0 0 0 0 1 0 | 135, 647, 1159, and 1671 |
| 19.6918 | 1 1 0 0 1 0 0 0 1 | 275, 787, 1299, and 1811 |
| 19.7080 | 0 1 0 1 0 0 0 1 0 | 138, 650, 1162, and 1674 |
| 19.7103 | 1 1 0 1 1 0 0 0 0 | 27, 539, 1051, and 1563 |

| max(PAPR) (dB) | AID sequence in VHTSIGA | | | | | | | | AID values marked/reserved for STA-to-AP packets |
|---|---|---|---|---|---|---|---|---|---|
| 10.4334 | 0 | 1 | 0 | 1 | 1 | 0 | 0 | 0 | 176, 688, 1200, and 1712 |
| 10.5558 | 0 | 1 | 0 | 0 | 1 | 0 | 1 | 0 | 148, 660, 1172, and 1684 |
| 10.6718 | 1 | 1 | 1 | 0 | 0 | 1 | 0 | 0 | 456, 968, 1480, and 1992 |
| 10.7120 | 1 | 0 | 1 | 0 | 1 | 1 | 0 | 1 | 345, 857, 1369, and 1881 |
| 10.8276 | 0 | 1 | 1 | 1 | 1 | 0 | 0 | 1 | 241, 753, 1265, and 1777 |
| 10.8675 | 1 | 1 | 0 | 0 | 1 | 0 | 1 | 0 | 404, 916, 1428, and 1940 |
| 10.8695 | 0 | 0 | 0 | 0 | 1 | 1 | 0 | 0 | 24, 536, 1048, and 1560 |
| 10.9091 | 0 | 0 | 1 | 1 | 1 | 1 | 1 | 0 | 126, 638, 1150, and 1662 |
| 10.9310 | 0 | 0 | 0 | 1 | 1 | 1 | 0 | 0 | 60, 572, 1084, and 1596 |
| 10.9822 | 1 | 1 | 1 | 1 | 0 | 1 | 0 | 1 | 491, 1003, and 1515 |
| 10.9847 | 1 | 0 | 1 | 1 | 1 | 1 | 1 | 0 | 382, 894, 1406, and 1918 |
| 10.9850 | 1 | 0 | 1 | 0 | 0 | 1 | 0 | 1 | 330, 842, 1354, and 1866 |
| 11.0186 | 0 | 1 | 0 | 0 | 0 | 1 | 0 | 1 | 138, 650, 1162, and 1674 |
| 11.0230 | 1 | 0 | 1 | 0 | 0 | 1 | 0 | 0 | 329, 841, 1353, and 1865 |
| 11.0519 | 1 | 0 | 1 | 1 | 1 | 0 | 1 | 1 | 379, 891, 1403, and 1915 |
| 11.0520 | 1 | 1 | 0 | 1 | 1 | 1 | 1 | 0 | 446, 958, 1470, and 1982 |

FIG. 12A

| max(PAPR) (dB) | AID sequence in VHTSIGA | | | | | | | | AID values marked/reserved for STA-to-AP packets | | | |
|---|---|---|---|---|---|---|---|---|---|---|---|---|
| 10.6312 | 0 | 1 | 1 | 0 | 1 | 0 | 1 | 1 | 470 | 982 | 1494 | 2006 |
| 10.8264 | 0 | 0 | 0 | 0 | 0 | 1 | 1 | 0 | 96 | 608 | 1120 | 1632 |
| 10.8514 | 0 | 0 | 1 | 0 | 1 | 0 | 1 | 1 | 212 | 724 | 1236 | 1748 |
| 10.8686 | 0 | 1 | 1 | 1 | 1 | 1 | 1 | 0 | 126 | 638 | 1150 | 1662 |
| 10.9435 | 0 | 1 | 0 | 1 | 1 | 1 | 1 | 1 | 506 | 1018 | 1530 | |
| 10.9637 | 0 | 0 | 1 | 1 | 1 | 1 | 0 | 0 | 124 | 636 | 1148 | 1660 |
| 10.9995 | 1 | 0 | 0 | 1 | 0 | 0 | 0 | 1 | 137 | 649 | 1161 | 1673 |
| 11.0374 | 0 | 0 | 1 | 0 | 0 | 0 | 0 | 1 | 132 | 644 | 1156 | 1668 |
| 11.0544 | 0 | 0 | 0 | 0 | 0 | 0 | 0 | 1 | 256 | 768 | 1280 | 1792 |
| 11.0977 | 0 | 0 | 1 | 0 | 0 | 0 | 0 | 1 | 388 | 900 | 1412 | 1924 |
| 11.1265 | 0 | 0 | 1 | 1 | 1 | 1 | 1 | 1 | 508 | 1020 | 1532 | |
| 11.1691 | 0 | 1 | 0 | 1 | 1 | 1 | 1 | 0 | 250 | 762 | 1274 | 1786 |
| 11.1702 | 0 | 0 | 0 | 1 | 0 | 1 | 0 | 1 | 424 | 936 | 1448 | 1960 |
| 11.1954 | 0 | 1 | 0 | 0 | 0 | 0 | 1 | 1 | 386 | 898 | 1410 | 1922 |
| 11.2088 | 0 | 1 | 1 | 1 | 0 | 1 | 1 | 0 | 238 | 750 | 1262 | 1774 |
| 11.2117 | 0 | 1 | 1 | 1 | 1 | 0 | 0 | 0 | 62 | 574 | 1086 | 1598 |

FIG. 12B

| max(PAPR) (dB) | AID sequence in VHTSIGA | | | | | | | | | AID values marked/reserved for STA-to-AP packets | | | |
|---|---|---|---|---|---|---|---|---|---|---|---|---|---|
| 11.5776 | 1 | 0 | 0 | 0 | 1 | 0 | 1 | 1 | 0 | 209 | 721 | 1233 | 1745 |
| 11.6432 | 0 | 0 | 1 | 0 | 0 | 0 | 0 | 0 | 0 | 4 | 516 | 1028 | 1540 |
| 11.6567 | 0 | 1 | 0 | 1 | 1 | 1 | 1 | 0 | 0 | 122 | 634 | 1146 | 1658 |
| 11.7965 | 1 | 0 | 0 | 1 | 0 | 0 | 0 | 1 | 0 | 137 | 649 | 1161 | 1673 |
| 12.0344 | 0 | 1 | 1 | 1 | 1 | 0 | 0 | 0 | 0 | 30 | 542 | 1054 | 1566 |
| 12.0691 | 0 | 1 | 1 | 1 | 1 | 0 | 1 | 0 | 0 | 94 | 606 | 1118 | 1630 |
| 12.0704 | 0 | 0 | 0 | 1 | 1 | 0 | 0 | 0 | 0 | 24 | 536 | 1048 | 1560 |
| 12.0771 | 1 | 0 | 0 | 1 | 0 | 0 | 0 | 1 | 1 | 393 | 905 | 1417 | 1929 |
| 12.1068 | 0 | 0 | 1 | 1 | 0 | 1 | 1 | 0 | 1 | 364 | 876 | 1388 | 1900 |
| 12.1235 | 0 | 1 | 0 | 1 | 0 | 0 | 1 | 1 | 1 | 458 | 970 | 1482 | 1994 |
| 12.1421 | 0 | 1 | 0 | 0 | 1 | 0 | 0 | 0 | 0 | 18 | 530 | 1042 | 1554 |
| 12.1523 | 0 | 0 | 0 | 0 | 0 | 1 | 1 | 0 | 1 | 352 | 864 | 1376 | 1888 |
| 12.1691 | 0 | 0 | 0 | 1 | 1 | 1 | 0 | 0 | 1 | 312 | 824 | 1336 | 1848 |
| 12.1795 | 0 | 1 | 0 | 0 | 1 | 0 | 0 | 0 | 1 | 274 | 786 | 1298 | 1810 |
| 12.1932 | 1 | 1 | 0 | 0 | 1 | 0 | 1 | 1 | 0 | 211 | 723 | 1235 | 1747 |
| 12.1996 | 0 | 0 | 0 | 1 | 0 | 1 | 1 | 0 | 0 | 104 | 616 | 1128 | 1640 |

FIG. 12C

| max(PAPR) (dB) | AID sequence in VHTSIGA | | | | | | | | AID values marked/reserved for STA-to-AP packets | | | |
|---|---|---|---|---|---|---|---|---|---|---|---|---|
| 10.6134 | 1 | 0 | 0 | 1 | 0 | 0 | 1 | 1 | 1 | 457 | 969 | 1481 | 1993 |
| 10.6991 | 0 | 0 | 0 | 0 | 1 | 1 | 1 | 1 | 1 | 496 | 1008 | 1520 | |
| 10.7089 | 1 | 0 | 1 | 1 | 0 | 0 | 0 | 0 | 1 | 269 | 781 | 1293 | 1805 |
| 10.9557 | 0 | 0 | 1 | 1 | 1 | 0 | 0 | 1 | 1 | 412 | 924 | 1436 | 1948 |
| 10.9608 | 0 | 1 | 1 | 1 | 1 | 1 | 1 | 0 | 1 | 382 | 894 | 1406 | 1918 |
| 10.9630 | 1 | 0 | 1 | 0 | 1 | 0 | 0 | 1 | 0 | 149 | 661 | 1173 | 1685 |
| 10.9927 | 0 | 1 | 1 | 1 | 1 | 0 | 0 | 0 | 0 | 30 | 542 | 1054 | 1566 |
| 11.0066 | 0 | 1 | 0 | 0 | 0 | 0 | 1 | 0 | 1 | 322 | 834 | 1346 | 1858 |
| 11.0096 | 0 | 0 | 1 | 0 | 1 | 1 | 0 | 0 | 1 | 308 | 820 | 1332 | 1844 |
| 11.0640 | 0 | 0 | 1 | 1 | 1 | 1 | 1 | 0 | 0 | 124 | 636 | 1148 | 1660 |
| 11.0696 | 0 | 1 | 1 | 1 | 0 | 0 | 0 | 1 | 1 | 398 | 910 | 1422 | 1934 |
| 11.0976 | 0 | 0 | 0 | 1 | 1 | 0 | 0 | 0 | 0 | 24 | 536 | 1048 | 1560 |
| 11.1294 | 1 | 0 | 0 | 1 | 0 | 1 | 1 | 0 | 1 | 361 | 873 | 1385 | 1897 |
| 11.1321 | 0 | 1 | 1 | 1 | 1 | 0 | 1 | 0 | 0 | 94 | 606 | 1118 | 1630 |
| 11.1380 | 0 | 0 | 0 | 0 | 1 | 1 | 0 | 1 | 1 | 432 | 944 | 1456 | 1968 |
| 11.1396 | 0 | 0 | 1 | 1 | 1 | 1 | 0 | 1 | 1 | 444 | 956 | 1468 | 1980 |

FIG. 12D

| max(PAPR) (dB) | AID sequence in VHTSIGA | | | | | | | | AID values marked/reserved for STA-to-AP packets | | | |
|---|---|---|---|---|---|---|---|---|---|---|---|---|
| 10.3455 | 0 | 0 | 0 | 0 | 0 | 1 | 1 | 1 | 0 | 224 | 736 | 1248 | 1760 |
| 10.4611 | 0 | 0 | 1 | 0 | 0 | 1 | 1 | 1 | 1 | 484 | 996 | 1508 | |
| 10.4881 | 1 | 1 | 1 | 1 | 0 | 1 | 0 | 1 | 1 | 431 | 943 | 1455 | 1967 |
| 10.5009 | 1 | 1 | 1 | 0 | 0 | 1 | 0 | 1 | 1 | 423 | 935 | 1447 | 1959 |
| 10.5313 | 0 | 1 | 0 | 0 | 1 | 1 | 1 | 0 | 0 | 114 | 626 | 1138 | 1650 |
| 10.5766 | 0 | 0 | 1 | 0 | 1 | 0 | 1 | 0 | 1 | 340 | 852 | 1364 | 1876 |
| 10.5941 | 1 | 1 | 0 | 0 | 1 | 1 | 1 | 1 | 0 | 243 | 755 | 1267 | 1779 |
| 10.6287 | 0 | 1 | 0 | 0 | 1 | 0 | 1 | 0 | 1 | 338 | 850 | 1362 | 1874 |
| 10.6426 | 1 | 0 | 1 | 1 | 0 | 1 | 1 | 1 | 0 | 237 | 749 | 1261 | 1773 |
| 10.6741 | 0 | 1 | 1 | 0 | 1 | 1 | 0 | 1 | 1 | 438 | 950 | 1462 | 1974 |
| 10.6871 | 1 | 0 | 0 | 1 | 1 | 1 | 1 | 0 | 0 | 121 | 633 | 1145 | 1657 |
| 10.6907 | 0 | 0 | 0 | 0 | 0 | 0 | 1 | 1 | 1 | 448 | 960 | 1472 | 1984 |
| 10.7559 | 0 | 0 | 1 | 1 | 0 | 1 | 0 | 0 | 1 | 300 | 812 | 1324 | 1836 |
| 10.8092 | 0 | 0 | 0 | 1 | 1 | 0 | 0 | 0 | 0 | 24 | 536 | 1048 | 1560 |
| 10.8256 | 1 | 0 | 0 | 0 | 1 | 1 | 0 | 0 | 1 | 305 | 817 | 1329 | 1841 |
| 10.8394 | 0 | 1 | 1 | 0 | 1 | 1 | 0 | 0 | 0 | 54 | 566 | 1078 | 1590 |

FIG. 12E

| max(PAPR) (dB) | AID sequence in VHTSIGA | Decimal AID values |
|---|---|---|
| 17.5952 | 1 1 1 1 1 1 1 1 1 | 511, 1023, and 1535 |
| 15.4745 | 1 1 1 1 0 1 0 1 0 | 175, 687, 1199, and 1711 |
| 15.4684 | 1 1 1 1 1 1 1 0 0 | 127, 639, 1151, and 1663 |
| 15.1256 | 1 1 1 1 1 1 1 1 0 | 255, 767, 1279, and 1791 |
| 15.0843 | 1 1 0 0 1 1 0 0 0 | 51, 563, 1075, and 1587 |
| 15.0243 | 1 1 1 0 1 0 1 0 1 | 343, 855, 1367, and 1879 |
| 14.8428 | 1 1 1 1 1 1 0 0 0 | 63, 575, 1087, and 1599 |
| 14.4966 | 1 0 0 1 1 0 0 0 1 | 281, 793, 1305, and 1817 |
| 14.3754 | 1 1 0 1 0 1 0 1 0 | 171, 683, 1195, and 1707 |
| 14.3559 | 1 1 1 1 1 1 0 1 0 | 191, 703, 1215, and 1727 |
| 14.3101 | 1 1 1 1 1 1 0 0 1 | 319, 831, 1343, and 1855 |
| 14.2666 | 1 0 1 0 1 1 1 0 0 | 117, 629, 1141, and 1653 |
| 14.2459 | 1 1 1 1 1 0 1 0 0 | 95, 607, 1119, and 1631 |
| 14.2253 | 1 1 1 1 1 0 0 0 1 | 287, 799, 1311, and 1823 |
| 14.1899 | 1 1 1 1 0 1 0 0 1 | 303, 815, 1327, and 1839 |
| 14.0905 | 1 0 0 1 1 1 1 0 1 | 377, 889, 1401, and 1913 |

FIG. 13A

| max(PAPR) (dB) | AID sequence in VHTSIGA | Decimal AID values |
|---|---|---|
| 16.3099 | 1 1 1 1 1 1 1 1 | 511  1023  1535 |
| 15.7377 | 1 1 1 1 1 1 1 0 | 255  767  1279  1791 |
| 15.7038 | 1 1 1 1 0 0 1 0 | 207  719  1231  1743 |
| 15.6868 | 1 1 1 1 1 1 0 1 | 383  895  1407  1919 |
| 15.6156 | 1 1 1 1 1 0 0 1 | 415  927  1439  1951 |
| 15.2874 | 1 1 1 0 0 1 1 0 | 103  615  1127  1639 |
| 15.1706 | 1 0 1 0 1 0 1 1 | 469  981  1493  2005 |
| 15.1330 | 0 0 1 1 1 1 0 0 1 | 316  828  1340  1852 |
| 15.0871 | 1 1 1 1 1 1 1 0 0 | 127  639  1151  1663 |
| 15.0869 | 1 1 1 1 1 1 0 1 0 | 191  703  1215  1727 |
| 15.0346 | 1 1 1 1 1 0 1 0 0 | 95  607  1119  1631 |
| 14.6897 | 1 1 0 0 1 1 0 0 0 | 51  563  1075  1587 |
| 14.6477 | 1 1 0 1 0 1 0 1 1 | 427  939  1451  1963 |
| 14.5699 | 1 0 0 1 1 0 0 0 0 | 25  537  1049  1561 |
| 14.5361 | 1 1 1 0 1 0 0 0 0 | 23  535  1047  1559 |
| 14.5070 | 0 1 0 1 0 1 1 1 0 | 234  746  1258  1770 |

FIG. 13B

| max(PAPR) (dB) | AID sequence in VHTSIGA | Decimal AID values |
|---|---|---|
| 17.7338 | 1 1 1 1 1 1 1 1 1 | 511 1023 1535 |
| 16.2391 | 1 1 1 1 1 1 1 1 0 | 255 767 1279 1791 |
| 15.7038 | 1 1 1 1 0 0 1 1 0 | 207 719 1231 1743 |
| 15.6868 | 1 1 1 1 1 1 1 0 1 | 383 895 1407 1919 |
| 15.6813 | 1 1 1 1 0 1 0 1 0 | 175 687 1199 1711 |
| 15.6178 | 1 1 1 1 1 1 1 0 0 | 127 639 1151 1663 |
| 15.6174 | 1 1 1 1 1 0 1 0 1 | 351 863 1375 1887 |
| 15.6156 | 1 1 1 1 1 0 0 1 1 | 415 927 1439 1951 |
| 15.6064 | 1 1 1 1 1 1 0 1 0 | 191 703 1215 1727 |
| 15.5839 | 1 1 1 1 1 1 0 0 1 | 319 831 1343 1855 |
| 15.2874 | 1 1 1 0 0 1 1 0 0 | 103 615 1127 1639 |
| 15.2518 | 1 1 0 0 1 1 0 0 0 | 51 563 1075 1587 |
| 15.2441 | 1 1 1 0 1 0 1 0 1 | 343 855 1367 1879 |
| 15.2168 | 1 1 0 1 0 1 0 1 1 | 427 939 1451 1963 |
| 15.1706 | 1 0 1 0 1 0 1 1 1 | 469 981 1493 2005 |
| 15.1330 | 0 0 1 1 1 1 0 0 1 | 316 828 1340 1852 |

FIG. 13C

| max(PAPR) (dB) | AID sequence in VHTSIGA | | | | | | | | Decimal AID values | | | |
|---|---|---|---|---|---|---|---|---|---|---|---|---|
| 16.1862 | 1 | 1 | 1 | 1 | 1 | 1 | 1 | 1 | 511 | 1023 | 1535 | |
| 15.6139 | 1 | 1 | 1 | 1 | 1 | 1 | 1 | 0 | 255 | 767 | 1279 | 1791 |
| 15.5484 | 1 | 1 | 1 | 1 | 1 | 1 | 0 | 1 | 383 | 895 | 1407 | 1919 |
| 15.4894 | 1 | 1 | 1 | 1 | 0 | 0 | 1 | 0 | 207 | 719 | 1231 | 1743 |
| 15.4199 | 1 | 1 | 1 | 1 | 0 | 0 | 1 | 1 | 415 | 927 | 1439 | 1951 |
| 15.0601 | 1 | 1 | 1 | 0 | 0 | 1 | 0 | 0 | 103 | 615 | 1127 | 1639 |
| 15.0313 | 1 | 0 | 1 | 0 | 1 | 0 | 1 | 1 | 469 | 981 | 1493 | 2005 |
| 14.9538 | 1 | 1 | 1 | 1 | 1 | 1 | 0 | 0 | 127 | 639 | 1151 | 1663 |
| 14.9387 | 1 | 1 | 1 | 1 | 1 | 0 | 1 | 0 | 191 | 703 | 1215 | 1727 |
| 14.8537 | 1 | 1 | 1 | 1 | 1 | 0 | 0 | 0 | 95 | 607 | 1119 | 1631 |
| 14.5382 | 1 | 1 | 0 | 0 | 1 | 0 | 0 | 0 | 51 | 563 | 1075 | 1587 |
| 14.5054 | 1 | 1 | 0 | 1 | 0 | 1 | 0 | 1 | 427 | 939 | 1451 | 1963 |
| 14.4312 | 1 | 0 | 0 | 1 | 1 | 0 | 0 | 0 | 25 | 537 | 1049 | 1561 |
| 14.3918 | 1 | 0 | 0 | 0 | 0 | 1 | 1 | 0 | 225 | 737 | 1249 | 1761 |
| 14.3503 | 0 | 1 | 0 | 1 | 0 | 1 | 1 | 0 | 234 | 746 | 1258 | 1770 |
| 14.3086 | 1 | 1 | 1 | 1 | 1 | 0 | 1 | 0 | 351 | 863 | 1375 | 1887 |

FIG. 13D

| max(PAPR) (dB) | AID sequence in VHTSIGA | | | | | | | | Decimal AID values | | | |
|---|---|---|---|---|---|---|---|---|---|---|---|---|
| 15.1988 | 1 | 1 | 1 | 0 | 0 | 0 | 1 | 1 | 391 | 903 | 1415 | 1927 |
| 15.1132 | 1 | 1 | 1 | 0 | 1 | 0 | 1 | 1 | 215 | 727 | 1239 | 1751 |
| 15.0985 | 1 | 1 | 0 | 0 | 0 | 0 | 1 | 1 | 195 | 707 | 1219 | 1731 |
| 14.5890 | 1 | 1 | 0 | 1 | 0 | 0 | 1 | 0 | 75 | 587 | 1099 | 1611 |
| 14.0825 | 1 | 0 | 1 | 0 | 1 | 0 | 1 | 0 | 341 | 853 | 1365 | 1877 |
| 13.8925 | 1 | 1 | 0 | 0 | 1 | 1 | 1 | 0 | 227 | 739 | 1251 | 1763 |
| 13.8331 | 1 | 1 | 0 | 0 | 0 | 1 | 0 | 1 | 419 | 931 | 1443 | 1955 |
| 13.7631 | 1 | 1 | 1 | 0 | 1 | 0 | 0 | 1 | 343 | 855 | 1367 | 1879 |
| 13.7311 | 1 | 0 | 0 | 1 | 0 | 0 | 1 | 0 | 329 | 841 | 1353 | 1865 |
| 13.6998 | 0 | 1 | 0 | 1 | 1 | 1 | 0 | 1 | 442 | 954 | 1466 | 1978 |
| 13.6742 | 0 | 0 | 0 | 1 | 0 | 1 | 1 | 0 | 232 | 744 | 1256 | 1768 |
| 13.6470 | 0 | 1 | 0 | 1 | 1 | 1 | 0 | 0 | 58 | 570 | 1082 | 1594 |
| 13.5026 | 1 | 1 | 0 | 1 | 1 | 0 | 1 | 0 | 347 | 859 | 1371 | 1883 |
| 13.4516 | 0 | 1 | 1 | 0 | 0 | 0 | 1 | 0 | 70 | 582 | 1094 | 1606 |
| 13.3867 | 1 | 0 | 1 | 1 | 0 | 0 | 1 | 0 | 205 | 717 | 1229 | 1741 |
| 13.3194 | 1 | 1 | 1 | 1 | 0 | 1 | 0 | 0 | 303 | 815 | 1327 | 1839 |

FIG. 13E

VHTSIGA PAPRs of Most Fields = 0

| Bit Fill Description | RSVD | Combination | SIGA1 | SIGA1 with magic seq | SIGA2 | SIGA2 with magic seq | HT SIG1 | HT SIG2 |
|---|---|---|---|---|---|---|---|---|
| (1) SU: All SIGA1 bits are zeros | 0 | 1 | 16.0951 | 3.0345 | | | 16.4723 | 8.1486 |
| Solution to (1):<br>Set GID = [111111] | 0 | 1 | 9.6884 | | | | | |
| (2) MU: GID has 1 bit on; Nsts has 2 bits on (two users, with 1 bit each) | 0 | 324 | 11.1952 | 11.1394 | | | | |
| (3) MU: All SIGA1 bits zeros except Nsts has 2 bits on (two users, with 1 bit ach) | 0 | 54 | 12.9430 | 8.8577 | | | | |
| (4) All SIGA2 bits = 0, CRC is based on all bits = 0 | 0 | 1 | | | 8.9038 | 4.4206 | | |
| (5) All SIGA2 bits = 0, CRC is based on GID having 1 bit on; Nsts having 2 bits on | 0 | 324 | | | 11.8052 | 9.5261 | | |
| (6) All SIGA2 bits = 0, CRC is based on All SIGA1 bits zeros except Nsts having 2 bits on | 0 | 54 | | | 11.8052 | 9.4132 | | |

FIG. 15A

VHTSIGA PAPRs of Most Fields = 0

| Bit Fill Description | RSVD | Combination | SIGA1 | SIGA1 with magic seq | SIGA2 | SIGA2 with magic seq | HT SIG1 | HT SIG2 |
|---|---|---|---|---|---|---|---|---|
| (7) SU: All SIGA1 bits are zeros | 1 | 1 | 14.8812 | 5.5256 | | | 16.4723 | 8.1486 |
| Solution to (7): Set GID = [111111] | 1 | 1 | 7.6767 | | | | | |
| (8) MU: GID has 1 bit on; Nsts has 2 bits on (two users, with 1 bit each) | 1 | 324 | 11.1902 | 11.1394 | | | | |
| (9) MU: All SIGA1 bits zeros except Nsts has 2 bits on (two users, with 1 bit ach) | 1 | 54 | 14.4356 | 9.4109 | | | | |
| (10) All SIGA2 bits = 0, CRC is based on all bits = 0 | 1 | 1 | | | 6.4882 | 6.5340 | | |
| (11) All SIGA2 bits = 0, CRC is based on GID having 1 bit on; Nsts having 2 bits on | 1 | 324 | | | 10.4742 | 9.4939 | | |
| (12) All SIGA2 bits = 0, CRC is based on all SIGA1 bits zeros except Nsts having 2 bits on | 1 | 54 | | | 8.8613 | 10.3702 | | |

FIG. 15B

VHTSIGB PAPRs of Most Fields = 0 MU Case

| Bit Fill Description | RSVD | Combination | SIGB PAPR | SIGB with magic seq |
|---|---|---|---|---|
| (1) All bits are zeros, tail = 0, Length = 14 bytes | N/A | 1 | 12.0605 | 5.4407 |
| (2) All bits are zeros, tail = 0, Length = 18 bytes | N/A | 1 | 10.8176 | 7.2981 |
| (3) All bits are zeros, tail = 0, Length = 26 bytes | N/A | 1 | 12.0605 | 6.0696 |
| (4) All bits are zeros, tail = 0, Length = 64 bytes | N/A | 1 | 12.0605 | 7.7945 |

FIG. 16A

**VHTSIGB PAPRs of Most Fields = 0
SU Case with 20MHz**

| Bit Fill Description | RSVD | Combination | SIGB PAPR | SIGB with magic seq |
|---|---|---|---|---|
| (1) All bits are zeros, tail = 0, Length = 14 bytes | 0 | 1 | 12.0605 | 5.4407 |
| (2) All bits are zeros, tail = 0, Length = 18 bytes | 0 | 1 | 10.8176 | 7.2981 |
| (3) All bits are zeros, tail = 0, Length = 26 bytes | 0 | 1 | 12.0605 | 6.0696 |
| (4) All bits are zeros, tail = 0, Length = 64 bytes | 0 | 1 | 12.0605 | 7.7945 |
| (5) All bits are zeros, tail = 0, Length = 14 bytes | 1 | 1 | 6.6582 | 6.2313 |
| (6) All bits are zeros, tail = 0, Length = 18 bytes | 1 | 1 | 7.6932 | 7.6236 |
| (7) All bits are zeros, tail = 0, Length = 26 bytes | 1 | 1 | 7.4373 | 6.3536 |
| (8) All bits are zeros, tail = 0, Length = 64 bytes | 1 | 1 | 6.9968 | 5.2863 |

FIG. 16B

VHTSIG PAPRs of All Ones

| Bit Fill Description | RSVD | Combination | SIGA1 PAPR | SIGA1 w/ magic seq | SIGA2 PAPR | SIGA2 with magic seq |
|---|---|---|---|---|---|---|
| (1) BW=111(160MHz), STBC=1, GID=111111, Nsts=1,3,5,7, AID=111111111 | 1 | 4 | 17.5952 | 9.4646 | | |
| (1) BW=111, STBC=1, GID=000000, Nsts=1,3,5,7, AID=111111111 | 1 | 4 | 13.1085 | 9.6345 | | |
| (3) All ones, CRC is based on all ones except tail is 0 | 1 | 1 | | | 14.1630 | 12.3494 |

(17A)

| Bit Fill Description | RSVD | Combination | SIGB PAPR | SIGB with magic seq |
|---|---|---|---|---|
| (1) All ones, except tail=0 | 1 | 1 | 9.3666 | 7.1249 |

CONSTRUCTING VERY HIGH THROUGHPUT SIGNAL (VHT-SIG) FIELDS FOR REDUCED PEAK-TO-AVERAGE POWER RATIO (PAPR)

CLAIM OF PRIORITY UNDER 35 U.S.C. §119

The present Application for patent claims benefit of U.S. Provisional Patent Application Ser. No. 61/372,790, filed Aug. 11, 2010, U.S. Provisional Patent Application Ser. No. 61/385,390, filed Sep. 22, 2010, U.S. Provisional Patent Application Ser. No. 61/390,543, filed Oct. 6, 2010, U.S. Provisional Patent Application Ser. No. 61/406,903, filed Oct. 26, 2010, and U.S. Provisional Patent Application Ser. No. 61/419,652, filed Dec. 3, 2010, and assigned to the assignee hereof and hereby expressly incorporated by reference herein.

BACKGROUND

1. Field

Certain aspects of the present disclosure generally relate to wireless communications and, more particularly, to construction of a signal field within a transmission preamble that may help reduce peak-to-average power ratio (PAPR) of the transmission.

2. Background

The Institute of Electrical and Electronics Engineers (IEEE) 802.11 Wide Local Area Network (WLAN) standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A VHT Signal (VHT-SIG) field is a part of a transmission preamble, and can be utilized to indicate various features of corresponding transmissions.

SUMMARY

Certain aspects of the present disclosure provide a method for wireless communications. The method generally includes constructing a very high throughput signal (VHT-SIG) field, scrambling one or more bits of the VHT-SIG field, and transmitting the VHT-SIG field with one or more scrambled bits over a wireless channel.

Certain aspects of the present disclosure provide an apparatus for wireless communications. The apparatus generally includes means for constructing a very high throughput signal (VHT-SIG) field, means for scrambling one or more bits of the VHT-SIG field, and means for transmitting the VHT-SIG field with one or more scrambled bits over a wireless channel.

Certain aspects of the present disclosure provide an apparatus for wireless communications. The apparatus generally includes a circuit configured to construct a very high throughput signal (VHT-SIG) field, an encoder configured to scramble one or more bits of the VHT-SIG field, and a transmitter configured to transmit the VHT-SIG field with one or more scrambled bits over a wireless channel.

Certain aspects of the present disclosure provide a computer readable medium containing executable instructions for wireless communications. The executable instructions generally include instructions for constructing a very high throughput signal (VHT-SIG) field, scrambling one or more bits of the VHT-SIG field, and transmitting the VHT-SIG field with one or more scrambled bits over a wireless channel by utilizing a bandwidth of a first size.

Certain aspects of the present disclosure provide an access point. The access point generally includes at least one antenna, a circuit configured to construct a very high throughput signal (VHT-SIG) field, an encoder configured to scramble one or more bits of the VHT-SIG field, and a transmitter configured to transmit via the at least one antenna the VHT-SIG field with one or more scrambled bits over a wireless channel.

Certain aspects of the present disclosure provide a method for wireless communications. The method generally includes receiving, over a wireless channel, a transmission containing a very high throughput signal (VHT-SIG) field with one or more bits altered via scrambling prior to transmission and de-scrambling the one or more scrambled bits of the VHT-SIG field.

Certain aspects of the present disclosure provide an apparatus for wireless communications. The apparatus generally includes means for receiving, over a wireless channel, a transmission containing a very high throughput signal (VHT-SIG) field with one or more bits altered via scrambling prior to transmission and means for de-scrambling the one or more scrambled bits of the VHT-SIG field.

Certain aspects of the present disclosure provide an apparatus for wireless communications. The apparatus generally includes a receiver configured to receive, over a wireless channel, a transmission containing a very high throughput signal (VHT-SIG) field with one or more bits altered via scrambling prior to transmission, and a decoder configured to de-scramble the one or more scrambled bits of the VHT-SIG field scramble one or more bits of the VHT-SIG field.

Certain aspects of the present disclosure provide a computer readable medium containing executable instructions for wireless communications. The executable instructions generally include instructions for receiving, over a wireless channel, a transmission containing a very high throughput signal (VHT-SIG) field with one or more bits altered via scrambling prior to transmission and de-scrambling the one or more scrambled bits of the VHT-SIG field.

Certain aspects of the present disclosure provide an access terminal. The access terminal generally includes at least one antenna, a receiver configured to receive, over a wireless channel via the at least one antenna, a transmission containing a very high throughput signal (VHT-SIG) field with one or more bits altered via scrambling prior to transmission, and a decoder configured to de-scramble the one or more scrambled bits of the VHT-SIG field scramble one or more bits of the VHT-SIG field.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6 illustrates example VHT-SIG field values in accordance with certain aspects of the present disclosure.

FIG. 8 illustrates example PAPR results for data in accordance with certain aspects of the present disclosure.

FIGS. 9-11 illustrate example PAPR results for different Association Identifier (AID) sequences in the VHT-SIG field in accordance with certain aspects of the present disclosure.

FIGS. 12A-12E illustrate example PAPR results for different AID sequences in the VHT-SIG field transmitted from a user station to an access point in accordance with certain aspects of the present disclosure.

FIGS. 13A-13E illustrate example worst case PAPR results for different AID sequences in the VHT-SIG field in accordance with certain aspects of the present disclosure.

FIGS. 15A-15B illustrate example PAPR results of VHT-SIGA when most fields of the VHT-SIGA are zeros in accordance with certain aspects of the present disclosure.

FIGS. 16A-16B illustrate example PAPR results of VHT-SIGB when most fields of the VHT-SIGB are zeros in accordance with certain aspects of the present disclosure.

FIGS. 17A-17B illustrate example PAPR results of the VHT-SIG field when the VHT-SIG comprises all ones in accordance with certain aspects of the present disclosure.

DETAILED DESCRIPTION

Figure 1:
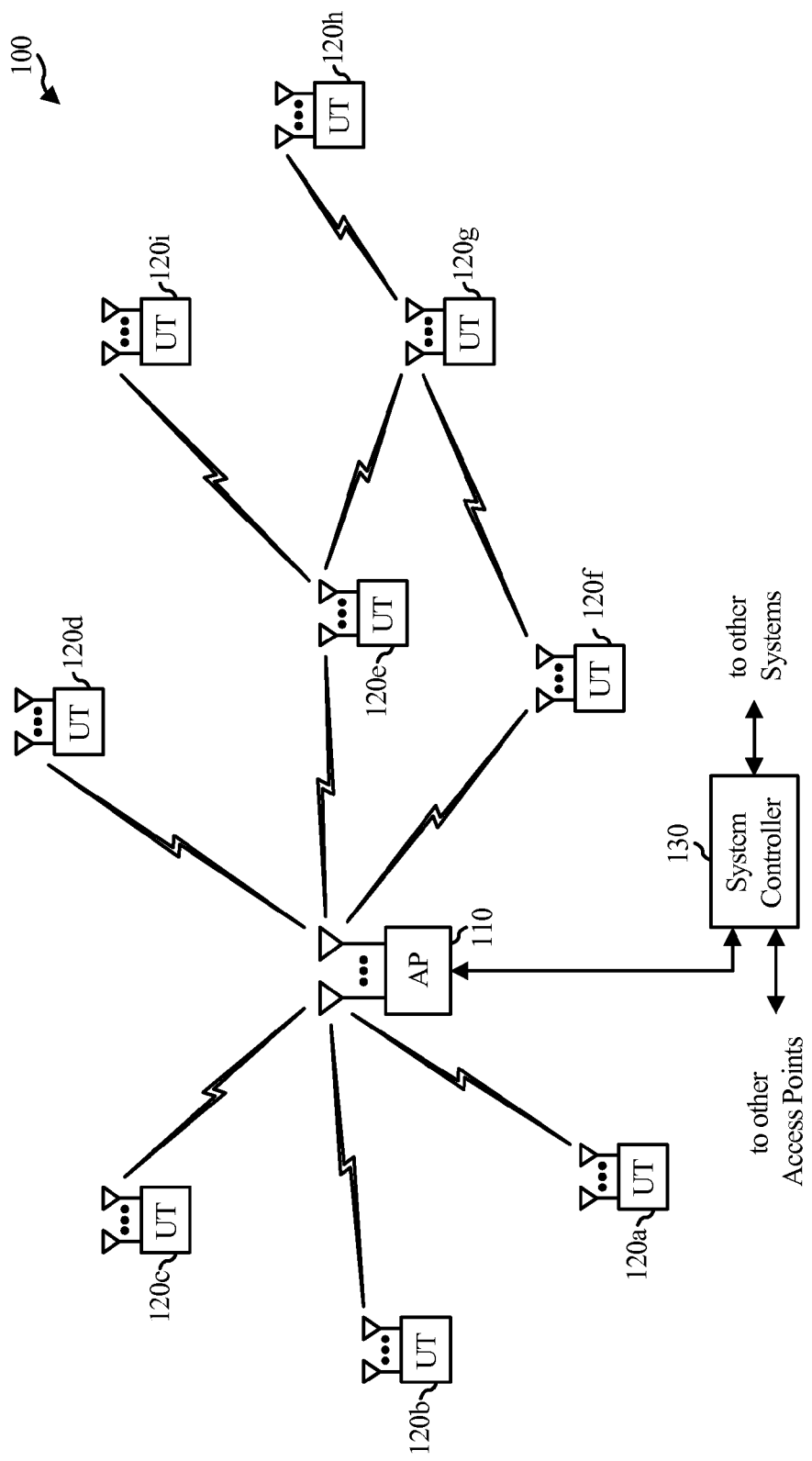
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE)802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flipcam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows, the term "receiving node" may be used to refer to a node that is receiving and the term "transmitting node" may be used to refer to a node that is transmitting. Such a reference does not imply that the node is incapable of performing both transmit and receive operations.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console or any other suitable wireless node.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support multiple-input multiple-output (MIMO) technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA) or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

In an aspect of the present disclosure, a training sequence may be constructed at the access point 110. The construction of training sequence may provide a desired level of peak-to-average power ratio (PAPR) when the training sequence is being transmitted within a preamble of a frame to user terminals 120. In another aspect, a training sequence may be constructed at the user terminal 120 such that the PAPR of training sequence transmitted within a preamble to the access point 110 may be at a desired level.

Figure 2:
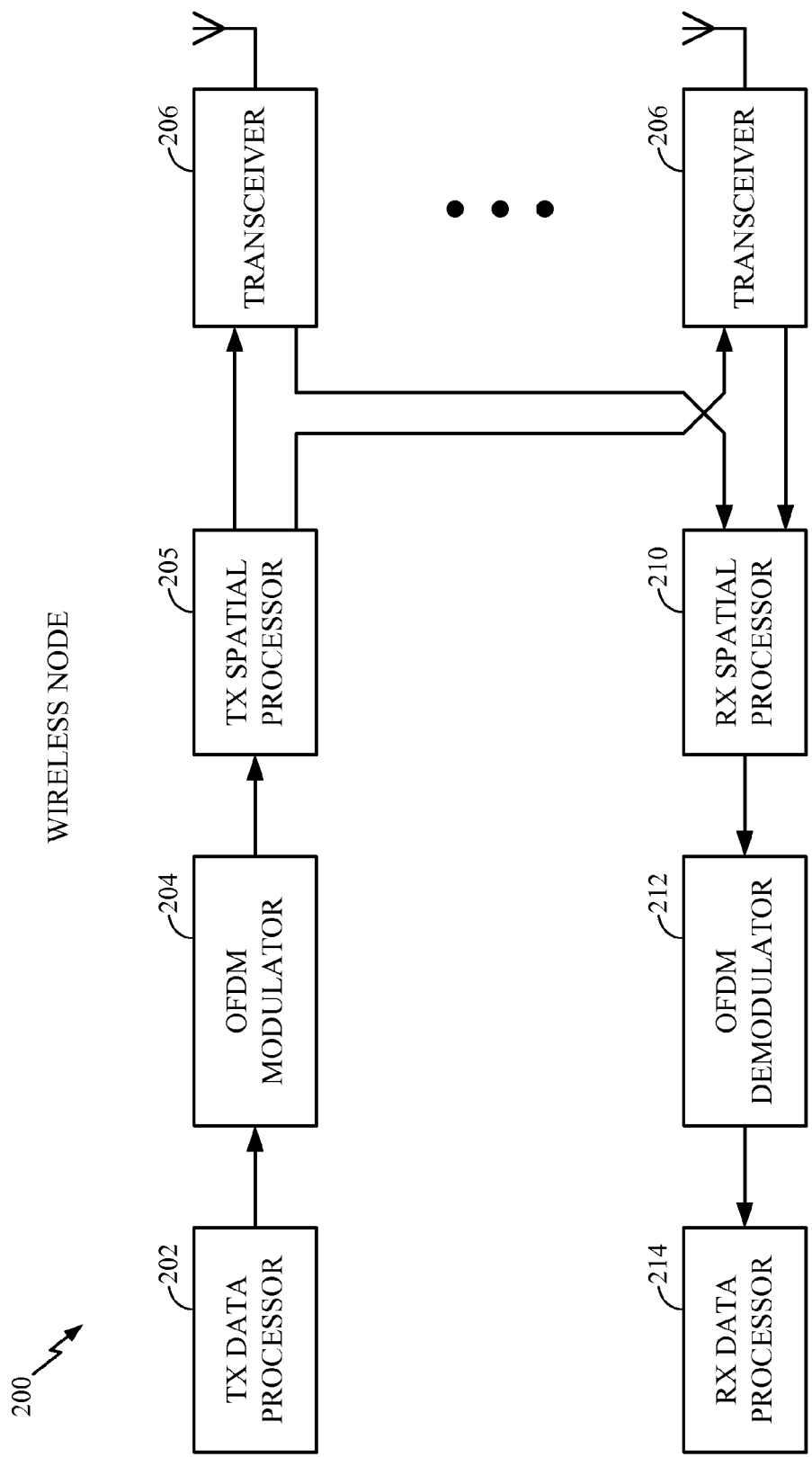
FIG. 2 illustrates a block diagram of an example of signal processing functions of a physical layer (PHY) of a wireless node in the wireless communications network of FIG. 1 in accordance with certain aspects of the present disclosure.

FIG. 2 illustrates a conceptual block diagram illustrating an example of the signal processing functions of the Physical (PHY) layer. In a transmit mode, a TX data processor 202 may be used to receive data from the Media Access Control (MAC) layer and encode (e.g., Turbo code) the data to facilitate forward error correction (FEC) at the receiving node. The encoding process results in a sequence of code symbols that that may be blocked together and mapped to a signal constellation by the TX data processor 202 to produce a sequence of modulation symbols.

In wireless nodes implementing OFDM, the modulation symbols from the TX data processor 202 may be provided to an OFDM modulator 204. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 206 performs spatial processing on the OFDM stream. This may be accomplished by spatially precoding each OFDM and then providing each spatially precoded stream to a different antenna 208 via a transceiver 206. Each transmitter 206 modulates an RF carrier with a respective precoded stream for transmission over the wireless channel.

In a receive mode, each transceiver 206 receives a signal through its respective antenna 208. Each transceiver 206 may be used to recover the information modulated onto an RF carrier and provide the information to a RX spatial processor 210.

The RX spatial processor 210 performs spatial processing on the information to recover any spatial streams destined for the wireless node 200. The spatial processing may be performed in accordance with Channel Correlation Matrix Inversion (CCMI), Minimum Mean Square Error (MMSE), Soft Interference Cancellation (SIC) or some other suitable technique. If multiple spatial streams are destined for the wireless node 200, they may be combined by the RX spatial processor 210.

In wireless nodes implementing OFDM, the stream (or combined stream) from the RX spatial processor 210 is provided to an OFDM demodulator 212. The OFDM demodulator 212 converts the stream (or combined stream) from time-domain to the frequency domain using a Fast Fourier Transform (FFT). The frequency domain signal comprises a separate stream for each subcarrier of the OFDM signal. The OFDM demodulator 212 recovers the data (i.e., modulation symbols) carried on each subcarrier and multiplexes the data into a stream of modulation symbols.

A RX data processor 214 may be used to translate the modulation symbols back to the correct point in the signal constellation. Because of noise and other disturbances in the wireless channel, the modulation symbols may not correspond to an exact location of a point in the original signal constellation. The RX data processor 214 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 214 then uses the sequence of code symbol LLRs in order to decode the data that was originally transmitted before providing the data to the MAC layer.

In an aspect of the present disclosure, the TX data processor 202 of the wireless node 200 may be configured to construct a training sequence. The construction of training sequence may be such that to provide a desired level of PAPR when the training sequence is being transmitted within a preamble of a frame to other wireless nodes (not shown in FIG. 2).

Figure 3:
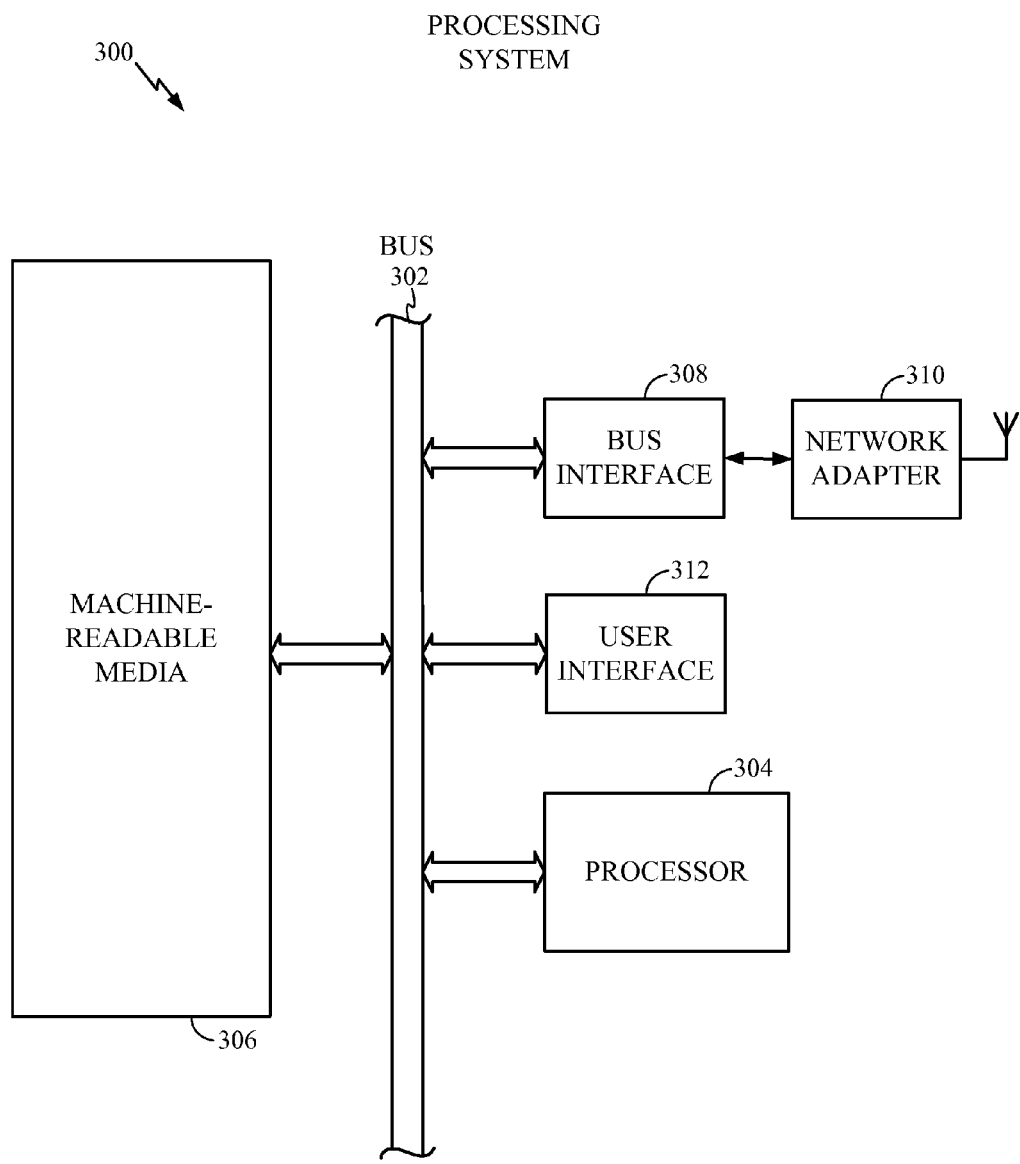
FIG. 3 illustrates a block diagram of an exemplary hardware configuration for a processing system in a wireless node in the wireless communications network of FIG. 1 in accordance with certain aspects of the present disclosure.

FIG. 3 illustrates a conceptual diagram illustrating an example of a hardware configuration for a processing system in a wireless node. In this example, the processing system 300 may be implemented with a bus architecture represented generally by bus 302. The bus 302 may include any number of interconnecting buses and bridges depending on the specific application of the processing system 300 and the overall design constraints. The bus links together various circuits including a processor 304, machine-readable media 306 and a bus interface 308. The bus interface 308 may be used to connect a network adapter 310, among other things, to the processing system 300 via the bus 302. The network adapter 310 may be used to implement the signal processing functions of the PHY layer. In the case of an access terminal 110 (see FIG. 1), a user interface 312 (e.g., keypad, display, mouse, joystick, etc.) may also be connected to the bus. The bus 302 may also link various other circuits such as timing sources, peripherals, voltage regulators, power management circuits, and the like, which are well known in the art, and therefore, will not be described any further.

The processor 304 is responsible for managing the bus and general processing, including the execution of software stored on the machine-readable media 306. The processor 304 may be implemented with one or more general-purpose and/or special-purpose processors. Examples include microprocessors, microcontrollers, DSP processors and other circuitry that can execute software. Software shall be construed broadly to mean instructions, data or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 3, the machine-readable media 306 is shown as part of the processing system 300 separate from the processor 304. However, as those skilled in the art will readily appreciate, the machine-readable media 306, or any portion thereof, may be external to the processing system 300. By way of example, the machine-readable media 306 may include a transmission line, a carrier wave modulated by data, and/or a computer product separate from the wireless node, all which may be accessed by the processor 304 through the bus interface 308. Alternatively, or in addition to, the machine readable media 306, or any portion thereof, may be integrated into the processor 304, such as the case may be with cache and/or general register files.

The processing system 300 may be configured as a general-purpose processing system with one or more microprocessors providing the processor functionality and external memory providing at least a portion of the machine-readable media 306, all linked together with other supporting circuitry through an external bus architecture. Alternatively, the processing system 300 may be implemented with an ASIC (Application Specific Integrated Circuit) with the processor 304, the bus interface 308, the user interface 312 in the case of an access terminal), supporting circuitry (not shown), and at least a portion of the machine-readable media 306 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 300 depending on the particular application and the overall design constraints imposed on the overall system.

The wireless network 100 from FIG. 1 may represent the IEEE 802.11 Wide Local Area Network (WLAN) utilizing the very high throughput (VHT) protocol for signal transmissions with a carrier frequency of 5 GHz (i.e., IEEE 802.11ac) or with a carrier frequency of 60 GHz (i.e., IEEE 802.11ad) targeting aggregate throughputs larger than 1 Gigabits per second. The VHT 5 GHz specification may utilize a wider channel bandwidth, which may comprise two 40 MHz channels to achieve 80 MHz bandwidth therefore doubling the PHY data rate with negligible increase in cost compared to IEEE 802.11n.

Certain aspects of the present disclosure support constructing a training sequence within a preamble for the VHT-based transmissions that may provide a lower peak-to-average power ratio (PAPR) than the training sequences utilized in the art. In an aspect of the present disclosure, the training sequence may be constructed by the processor 304 of the processing system 300 from FIG. 3.

Constructing VHT-SIG Fields for Reduced PAPR

A Very High Throughput Signal (VHT-SIG) field may be used to convey various features of a corresponding transmission. According to certain aspects, a preamble may comprise different types of VHT-SIG fields, which may be contained in different portions of a preamble. As an example, a preamble may comprise a VHT-SIGA field (Very High Throughput Signal field type A) in a "legacy" portion of a preamble (e.g., in accordance with one or more earlier versions of a standard) and a VHT-SIGB field (Very High Throughput Signal field type B) in a "non-legacy" portion of a preamble (e.g., that may be precoded in accordance with one or more later versions of a standard).

According to certain aspects, a SIGA1 sub-field of the VHT-SIGA field may comprise almost all "zeros" for a practical packet (as illustrated in FIG. 6). In such cases, the encoded bit stream may comprise mostly zeros. In some cases, this may result in high level of Peak-to-average power ratio (PAPR). According to certain aspects, in such cases, portions of the VHT-SIG field may be scrambled in a manner that may help reduce PAPR.

Figure 4:
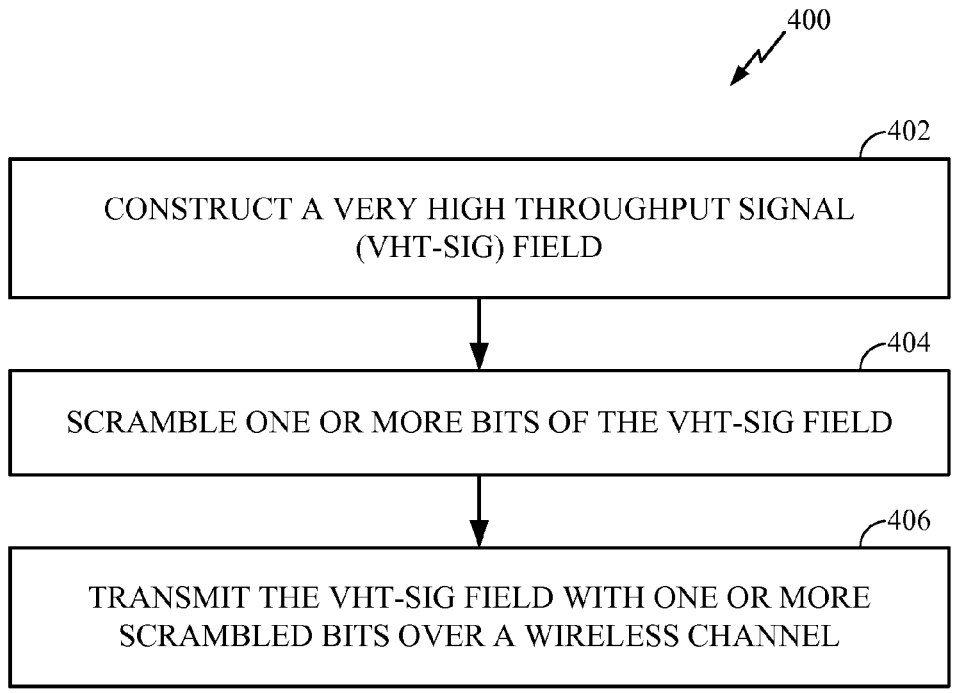
FIG. 4 illustrates example operations for constructing and transmitting a very high throughput signal (VHT-SIG) field in accordance with certain aspects of the present disclosure.

FIG. 4 illustrates example operations 400 for constructing and transmitting a VHT-SIG field of a preamble in accordance with certain aspects of the present disclosure. The operations may be performed, for example, at any transmitting device. According to certain aspects, the operations may be performed when an expected PAPR of transmitting the VHT-SIG field is above a certain threshold.

The operations 400 begin, at 402, by constructing a VHT-SIG field. At 404, one or more bits of the VHT-SIG field may be scrambled. At 406, the VHT-SIG field with one or more scrambled bits may be transmitted over a wireless channel.

Figure 5:
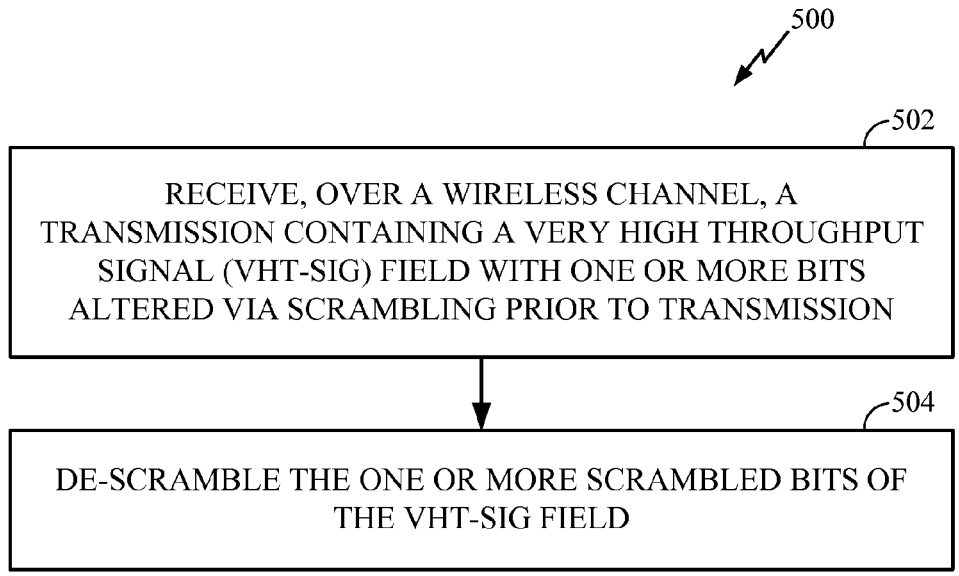
FIG. 5 illustrates example operations for receiving and processing a very high throughput signal (VHT-SIG) field in accordance with certain aspects of the present disclosure.

FIG. 5 illustrates example operations 500 for receiving and processing a VHT-SIG field of a preamble in accordance with certain aspects of the present disclosure. The operations may be performed, for example, at any device receiving a VHT-SIG field transmitted in accordance with the operations 400 described above.

The operations 500 begin, at 502, by receiving, over a wireless channel, a transmission containing a VHT-SIG field with one or more bits altered via scrambling prior to transmission. At 504, the one or more scrambled bits of the VHT-SIG field may be de-scrambled.

Figure 7:
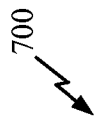
FIG. 7 illustrates a table of example peak-to-average power ratio (PAPR) results for different packet types in accordance with certain aspects of the present disclosure.

FIG. 6 illustrates example VHT-SIG field values in accordance with certain aspects of the present disclosure. As illustrated, a majority of the bits may have a zero value. However, transmitting an encoded bit stream with almost all zeros may result into a high level of PAPR. FIG. 7 illustrates a table of example PAPR results for different packet types in accordance with certain aspects of the present disclosure. As illustrated, the PAPR results are provided for two cases: the case 702 when all sub-fields in the SIG fields have zero values, and the Case 704 with ones in many places of the SIG fields while still forming a meaningful packet. As illustrated, PAPR may be reduced by scrambling one or more bits of SIG fields.

Scrambling of one or more bits in a VHT-SIG field (e.g., a SIGA and/or SIGB field) may help reduce PAPR and may be performed in various manners.

As an example, according to certain aspects, the scrambling may involve reversing one or more bits in some fields (e.g., zeros become ones). According to certain aspects, a scrambling algorithm in accordance with IEEE 802.11 family of wireless communications standards based on a known seed may be utilized. As an alternative, a scrambling algorithm may utilize a new (e.g., short) variable seed. According to certain aspects, the scrambling may involve re-locating one or more reserved bits in an effort to lower PAPR.

According to certain aspects, the scrambling may involve inverting one or more (or all) bits in one or more fields of a VHT-SIGA. In addition or as an alternative, the scrambling may also involve scrambling (e.g., with an 802.11a scrambling algorithm) of a VHT-SIGB field. An error check field (e.g., a Cyclic Redundancy Check (CRC)) may then be computed on the scrambled VHT-SIGB field.

FIG. 8 illustrates examples 802 and 804 for PAPR of transmission data in accordance with certain aspects of the present disclosure.

Selection of Association Identifier (AID) Value for Station-to-Access Point Transmissions According to certain aspects, for station-to-access point (STA-to-AP) transmission packets, a value of Association Identifier (AID) subfield of the VHT-SIGA field may be set to one of a plurality of special values. It should be noted that a Group ID subfield within the VHT-SIGA field may have a binary value equal to '111111' since all STA-to-AP transmissions represent single user (SU) transmissions. Certain aspects of the present disclosure propose selecting AID values for STA-to-AP transmissions such that VHT-SIGA PAPR statistics has preferred values.

Every AID value may result in a set of PAPR values for a combination of various bandwidths (BW), space-time block codes (STBC) and a number of space-time streams ($N_{STS}$). In order to optimize the PAPR statistics, the AID value may be chosen in an effort to reduce at least one of: a largest value among a plurality of values for PAPR of the transmitted VHT-SIGA field (i.e., to reduce the worst case PAPR), an average value of the plurality of values for PAPR of the transmitted VHT-SIG field (i.e., to reduce the mean PAPR), or to reduce a sum of the largest value and the average value. In an aspect, the effort to reduce the at least one of the largest PAPR value, the average PAPR value or the sum may comprise an effort to minimize the at least one of the largest PAPR value, the average PAPR value or the sum.

Without applying the proposed selection of AID values, the worst case PAPR may be as high as 18 dB. On the other hand, if the AID value is chosen from the set of values obtained in an effort to reduce or minimize the worst case PAPR, the worst case PAPR may be reduced below 10.5 dB.

The following 9-bit AID sequences (least significant bit (LSB) is the one being first from the left) may result in at least one of: a lowest value for the maximum PAPR, a lowest value for the average PAPR, or a lowest value for a sum of the maximum PAPR and the average PAPR. In an aspect, four times oversampled Inverse Fast Fourier Transform (IFFT) may be applied before transmitting the VHT-SIGA field within a preamble of STA-to-AP transmission packet.

In one aspect of the present disclosure, the AID value of '000011010' (i.e., decimal value of 176) may result in a lowest maximum (worst case) PAPR for the transmitted VHT-SIGA1 field. It should be noted that AID decimal values of 176, 688, 1200 and 1712 may be marked/reserved for STA-to-AP packets. In this aspect, the worst case PAPR for the transmitted VHT-SIGA1 field may be equal to 10.4334 dB.

In another aspect, the AID value of '100100010' (i.e., decimal value of 137) may result in a lowest average PAPR for the transmitted VHT-SIGA1 field. It should be noted that AID decimal values of 137, 649, 1161 and 1673 may be marked/reserved for STA-to-AP packets. In this aspect, the average PAPR for the transmitted VHT-SIGA1 field may be equal to 8.3487 dB.

In yet another aspect, the AID value of '000011010' (i.e., decimal value of 176) may result in a lowest value for a sum of the maximum PAPR and the average PAPR for the transmitted VHT-SIGA1 field. It should be noted that AID decimal values of 176, 688, 1200 and 1712 may be marked/reserved for STA-to-AP packets. In this aspect, the worst case PAPR for the transmitted VHT-SIGA1 field may be equal to 18.8869 dB. It can be observed that minimizing the worst case PAPR and minimizing the sum of the maximum PAPR and the average PAPR may result in the same AID sequences. This may be because the maximum PAPR may fluctuate faster and with a larger range than the average PAPR.

Certain aspects of the present disclosure support AID value selection for Multiple Basic Service Sets (M-BSS) with Power Save (PS) feature. For power save reasons, a different BSS may utilize a different AID sequence. For example, five or more preferred AID sequences may be chosen in an effort to reduce at least one of the maximum (worst case) PAPR, the average PAPR, or the sum of maximum (worst case) PAPR and the average PAPR. In an aspect, the effort to reduce the at least one of the maximum PAPR, the average PAPR or the sum may comprise an effort to minimize the at least one of the maximum PAPR, the average PAPR or the sum.

Figure 9:

FIG. 9 illustrates an example 900 of values for AID subfield of the VHT-SIGA field of the preamble in accordance with certain aspects of the present disclosure. The AID sequences given in FIG. 9 may be selected for M-BSS with PS to reduce or minimize a worst case PAPR of the transmitted VHT-SIGA field. In an aspect, the best 16 AID sequences listed in FIG. 9 may allow fast identification of 16 different access points (APs). Four times oversampled IFFT may be applied before transmitting the VHT-SIGA1 field with one of the listed AID sequences within the preamble of STA-to-AP transmission packet. The third column in FIG. 9 lists all decimal AID values comprising the 9 LSBs in the second column.

FIG. 10 illustrates an example 1000 of values for AID subfield of the VHT-SIGA field in accordance with certain aspects of the present disclosure. The AID sequences given in FIG. 10 may be selected for M-BSS with PS to reduce or minimize an average PAPR of the transmitted VHT-SIGA field. Four times oversampled IFFT may be applied before transmitting the VHT-SIGA1 field with one of the listed AID sequences within the preamble of STA-to-AP transmission packet. The third column in FIG. 10 lists all decimal AID values comprising the 9 LSBs in the second column.

Figure 11:

FIG. 11 illustrates an example 1100 of values for AID subfield of the VHT-SIGA field in accordance with certain aspects of the present disclosure. The AID sequences given in FIG. 11 may be selected for M-BSS with PS to reduce or minimize a sum of the maximum PAPR and the average PAPR of the transmitted VHT-SIGA field. Four times oversampled IFFT may be applied before transmitting the VHT-SIGA1 field with one of the listed AID sequences within the preamble of STA-to-AP transmission packet. The third column in FIG. 11 lists all decimal AID values comprising the 9 LSBs in the second column.

FIGS. 12A-12E illustrate examples of values for AID subfield of the VHT-SIGA1 field of the preamble that may be transmitted from a STA to an AP in accordance with certain aspects of the present disclosure. The AID sequences given in FIGS. 12A-12E may be determined in an effort to reduce or minimize a worst case PAPR of the transmitted VHT-SIGA1 field. Four times oversampled IFFT may be applied before transmitting the VHT-SIGA1 field with one of the listed AID sequences within the preamble of STA-to-AP transmission packet. The third columns in FIGS. 12A-12E list all decimal AID values comprising the 9 LSBs in the corresponding second columns.

The AID selection results illustrated in FIG. 12A may be obtained for the case when reserved bits in VHT-SIGA1 field comprises all 1s. The AID selection results illustrated in FIG. 12B may be obtained for the case when the reserved bits comprises all 0s. The AID selection results illustrated in FIG. 12C may be obtained for the case when the reserved bits are all random. The AID selection results illustrated in FIG. 12D may be obtained for the case when last two reserved bits in VHT-SIGA1 field comprise all 0s. The AID selection results illustrated in FIG. 12E may be obtained for the case when all reserved bits in VHT-SIGA1 field comprises all 1s, while Group ID subfield may be equal to zero.

Random Selection of Association ID

Avoiding worst case PAPR and reducing (or minimizing) worst case PAPR can be as important for station-to-access point (STA-to-AP) transmissions as for AP-to-STA transmissions. Certain aspects of the present disclosure support choosing an AID value associated with an access point (AP) in the same way as choosing an AID value associated with a station (STA).

In an aspect, the AP may assign itself a random AID value from the same range as the AIDs selected for its associated STAs. The range of AID values may be determined as previously described for the STA side. The range of AID values may be received at the AP from its associated STA. The AID of the AP may be signaled in at least one of: a Beacon frame, a Probe Response frame, or an Association Response frame.

FIGS. 13A-13E illustrate examples of values for AID subfield of the VHT-SIGA1 field of a packet that may be transmitted from an AP to a STA and/or from a STA to an AP in accordance with certain aspects of the present disclosure. The AID sequences given in FIGS. 13A-13E may result in the highest maximum PAPR of the transmitted VHT-SIGA1 field. Therefore, the AID values listed in FIGS. 13A-13E may need to be avoided for AP-to-STA transmissions and/or STA-to-AP transmissions. In an aspect, four times oversampled IFFT may be applied before transmitting the VHT-SIGA1 field. The third columns in FIGS. 13A-13E list all decimal AID values comprising the 9 LSBs in the corresponding second columns.

The AID sequences illustrated in FIG. 13A may be obtained for the case when reserved bits in VHT-SIGA1 field comprises all 1s. The AID sequences illustrated in FIG. 13B may be obtained for the case when the reserved bits comprises all 0s. The AID sequences illustrated in FIG. 13C may be obtained for the case when the reserved bits are all random. The AID sequences illustrated in FIG. 13D may be obtained for the case when last two reserved bits in VHT-SIGA1 field comprise all 0s. The AID sequences illustrated in FIG. 13E may be obtained for the case when all reserved bits in VHT-SIGA1 field comprises all 1s, while Group ID subfield may be equal to zero that may indicate Multi User (MU) transmission from an AP to STAs.

"MAGIC" Sequence Applied on VHT-SIG-A and VHT-SIG-B Fields

In an aspect of the present disclosure, information bits of at least one of VHT-SIG-A or VHT-SIG-B may be utilized for performing XOR operation with a "magic" sequence to minimize (or at least reduce) PAPR when transmitting the VHT-SIG. The "magic" sequence may be obtained by exhaustive search and identifying a sequence of bits with the lowest PAPR, while assuming all zeros in the at least one of VHT-SIG-A or VHT-SIG-B.

For VHT-SIG-A, the following 34-bit pattern (LSB first) may result in PAPR for VHT-SIGA1 of 3.0345 dB and PAPR for VHT-SIGA2 of 4.4206 dB: {1,1,0,1,1,0,1,0,1,0,1,0,0,1,1, 1,1,0,0,0,0,1,1,0,0,0,0,0,0,0,0,1,1,0}.

For VHT-SIG-B, the following 20/21/23 bits sequences (LSB first) may result in the lowest PAPR when using four times oversampled inverse fast Fourier transform (IFFT). In the case of 20 MHz bandwidth, the "magic" sequence may be {0, 0,0,0,0,1,1,1,0,1,0,0,0,1,0,0,0,0,1,0}, and the PAPR may be equal to 3.16 dB. In the case of 40 MHz bandwidth, the "magic" sequence may be {1,0,1,0,0,1,0,1,1,0,1,0,0,0,1,0,0, 0,0,1,1}, and the PAPR may be equal to 5.42 dB. In the case of 80 MHz bandwidth, the "magic" sequence may be {0,1,0, 1,0,0,1,1,0,0,1,0,1,1,1,1,1,1,0,0,1,0}, and the PAPR may be equal to 5.13 dB.

Figure 14A:
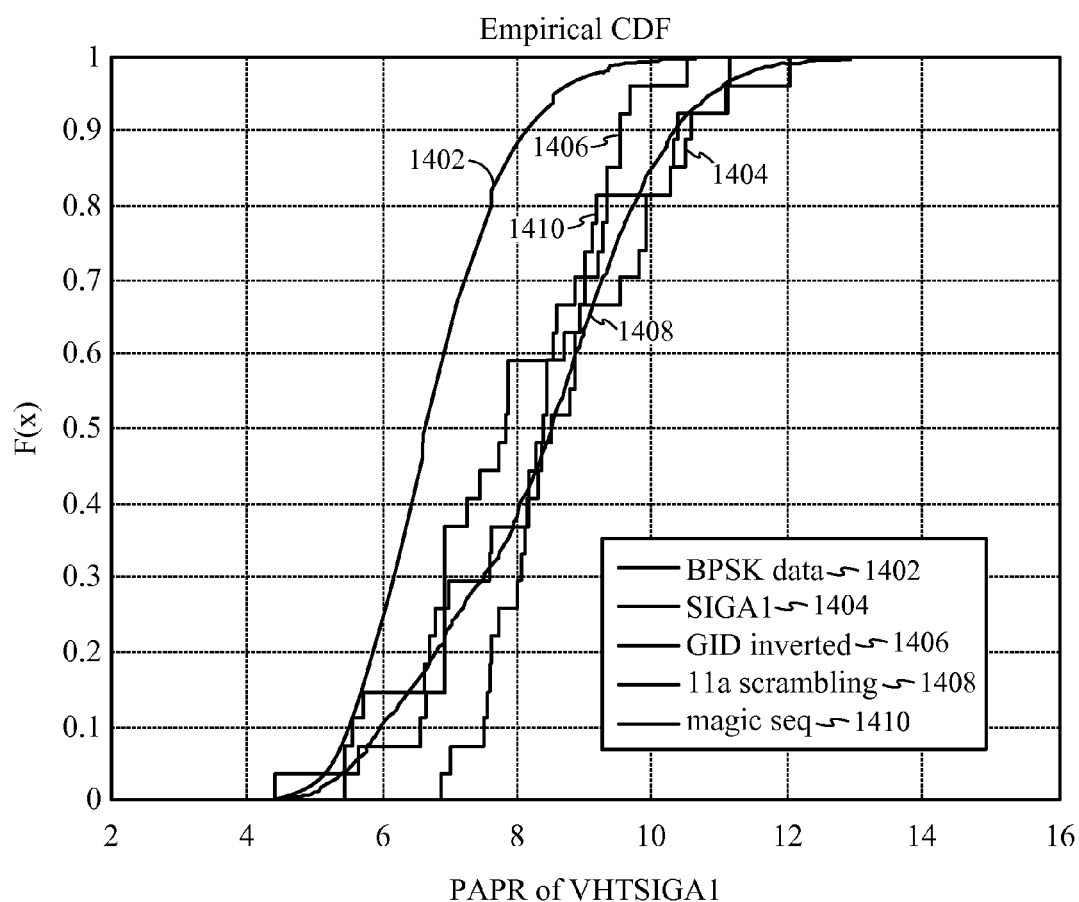
FIGS. 14A-14B illustrate example PAPR results of VHT-SIGA1 and VHT-SIGA2 fields in accordance with certain aspects of the present disclosure.

FIG. 14A illustrates example PAPR results of VHT-SIGA1 in accordance with certain aspects of the present disclosure. The PAPR of transmitting VHT-SIGA1 when the aforementioned 34-bit "magic" sequence is applied is illustrated by plot 1410. It should be noted that GID=0 and AID=0.

Figure 14B:
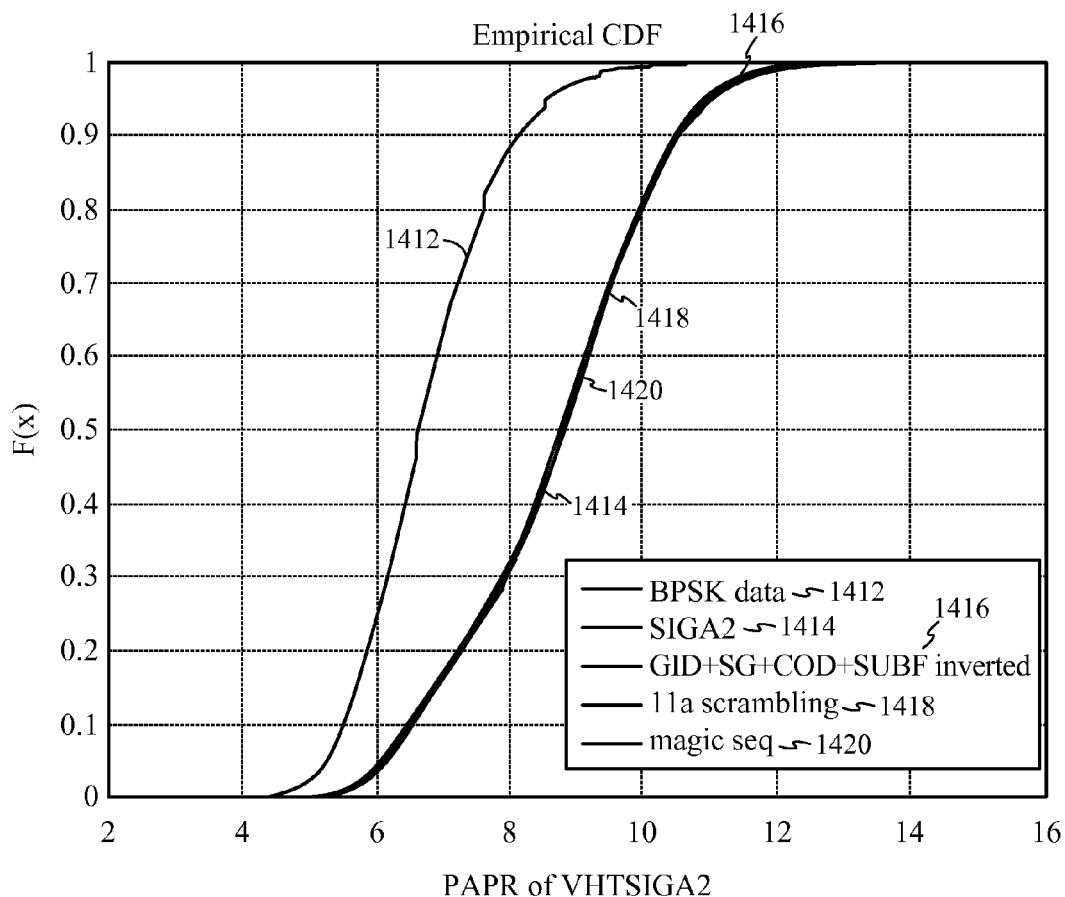

FIG. 14B illustrates example PAPR results of VHT-SIGA2 in accordance with certain aspects of the present disclosure. The PAPR of transmitting VHT-SIGA2 when the aforementioned "magic" sequence is applied is illustrated by plot 1420. It should be noted that again GID=0 and AID=0.

FIGS. 15A-15B illustrate examples of PAPR results of VHT-SIGA when most fields of the VHT-SIGA are zeros in accordance with certain aspects of the present disclosure. It can be observed substantial improvement in PAPR when the "magic" sequence of bits is applied on the VHT-SIGA (e.g., PAPR results in column 1502 when the "magic" sequence is applied on VHT-SIGA2 versus PAPR results in column 1504 when the "magic" sequence is not applied).

FIG. 16A illustrates example PAPR results of VHT-SIGB when most fields of the VHT-SIGB are zeros and wherein Multi-User (MU) communication is utilized in accordance with certain aspects of the present disclosure. It can be observed substantial improvement in PAPR when the "magic" sequence is applied on the VHT-SIGB (e.g., PAPR results in column 1602 when the "magic" sequence is applied on VHT-SIGB versus PAPR results in column 1604 when the "magic" sequence is not applied). In an aspect, it may be unlikely that MCS is zero, a pre-coder at a transmitter may be configured to mix streams, and it may be unlikely that small packets are transmitted.

FIG. 16B illustrates example PAPR results of VHT-SIGB when most fields of the VHT-SIGB are zeros and wherein Single-User (SU) communication is used with 20 MHz bandwidth in accordance with certain aspects of the present disclosure. It can be observed substantial improvement in PAPR when the "magic" sequence is applied on the VHT-SIGB (e.g., PAPR results in column 1606 when the "magic" sequence is applied on VHT-SIGB versus PAPR results in column 1608 when the "magic" sequence is not applied). Reserved bits of the VHT-SIGB may be set to all 1 s and may not be used. In an aspect, in the case of SU communication, a receiver may not be required to decode the VHT-SIGB.

FIG. 17A illustrate example PAPR results of the VHT-SIGA when the VHT-SIGA comprises all ones in accordance with certain aspects of the present disclosure. It can be observed substantial improvement in PAPR results when the "magic" sequence is applied on the VHT-SIGA1 (e.g., PAPR results in column 1702 when the "magic" sequence is applied on VHT-SIGA1 versus PAPR results in column 1704 when the "magic" sequence is not applied). Further, it can be observed substantial improvement in PAPR results when the "magic" sequence is applied on the VHT-SIGA2 (e.g., PAPR results in column 1706 when the "magic" sequence is applied on VHT-SIGA2 versus PAPR results in column 1708 when the "magic" sequence is not applied).

FIG. 17B illustrate example PAPR results of the VHT-SIGB when the VHT-SIGB comprises all ones in accordance with certain aspects of the present disclosure. It can be observed substantial improvement in PAPR when the "magic" sequence is applied on the VHT-SIGB, e.g., PAPR results in column 1710 when the "magic" sequence is applied on VHT-SIGB versus PAPR results in column 1712 when the "magic" sequence is not applied.

Tone Reservation in VHT-SIG-A

In an aspect of the present disclosure, a transmitter may be configured to choose two reserved bits in VHT-SIGA1. A receiver may be configured to decode the VHT-SIG field without utilizing these reserved bits. The transmitter may be able to reduce PAPR on packet-by-packet basis by choosing the optimal two reserved bits. For example, this may be achieved by using a look-up table. In an aspect, the optimization may be based on a location of the two reserved bits (e.g., an end of the VHT-SIGA1), and on minimizing the PAPR of VHT-SIGA1.

Figure 18A:
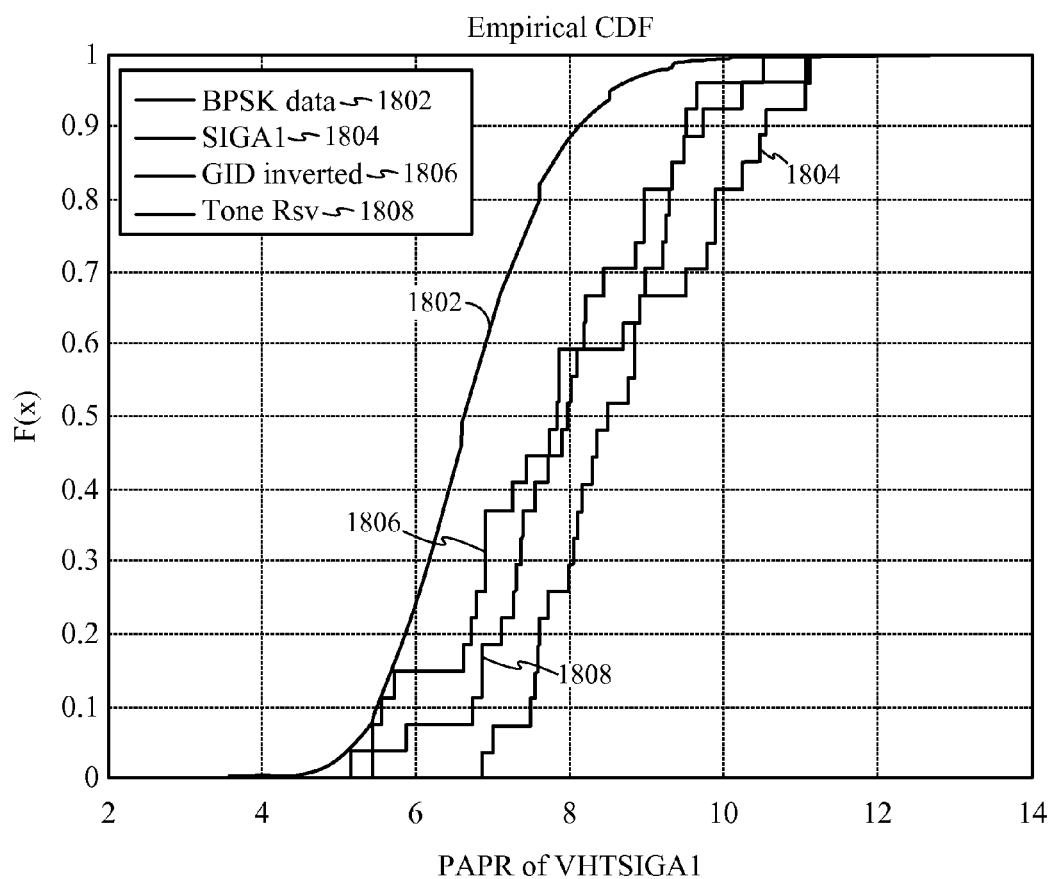
FIGS. 18A-18D illustrate example PAPR results of VHT-SIGA1 and VHT-SIGA2 fields in accordance with certain aspects of the present disclosure.
Figure 18B:
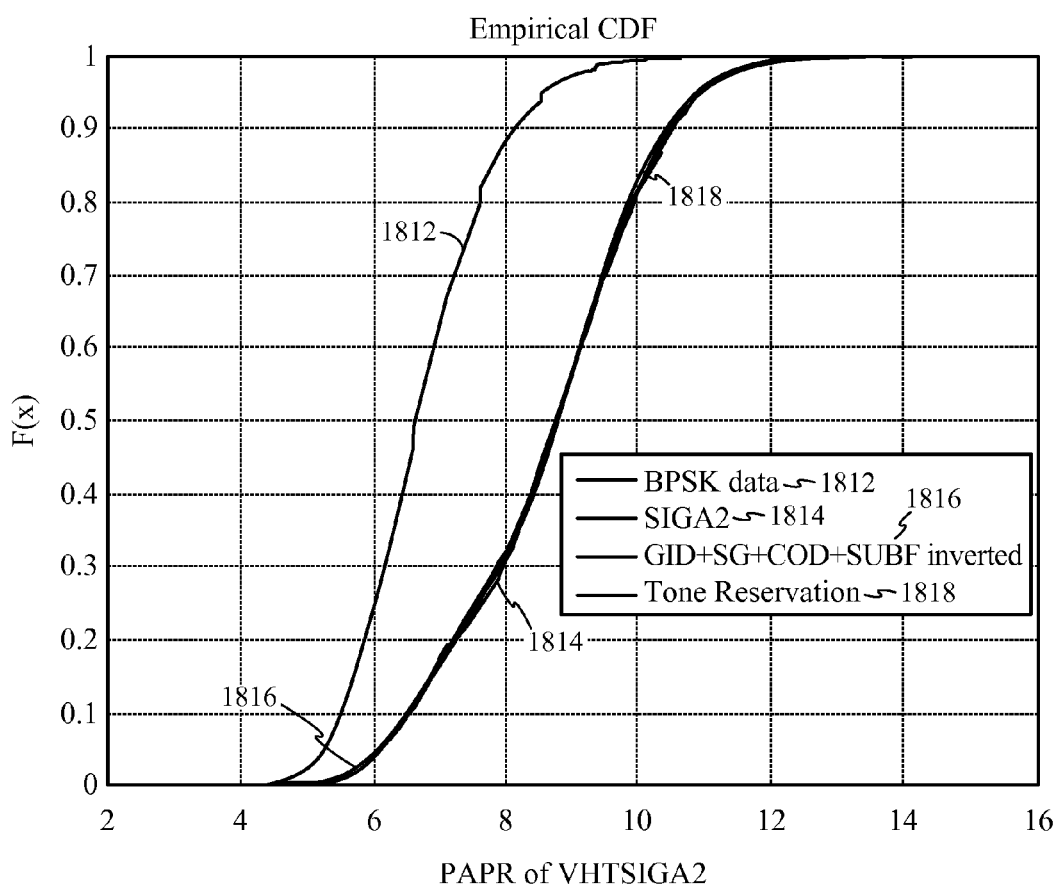
Figure 18C:
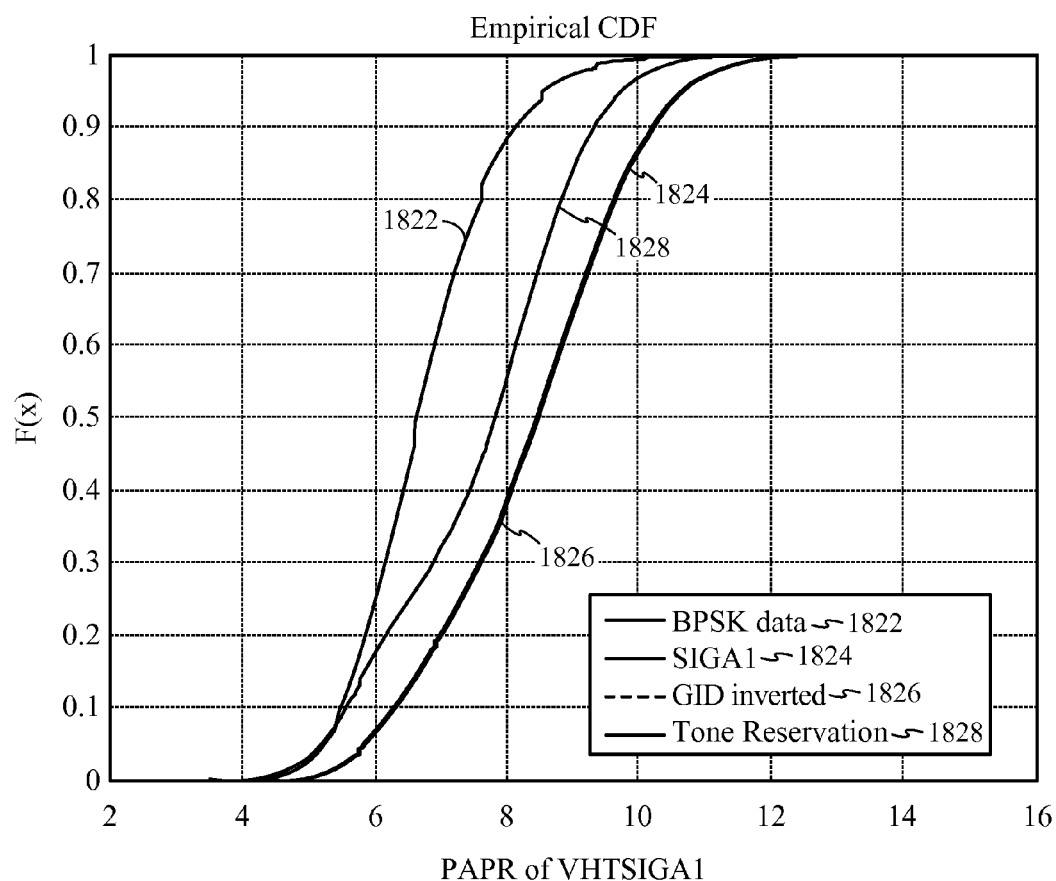

It can be observed from FIG. 18A and FIG. 18C (example PAPR results of VHT-SIGA1 for GID/AID=0 and GID being random, respectively) that the PAPR for tone reservation (plots 1808, 1828) is constantly better than the PAPR for the original VHT-SIGA1 (plots 1804, 1824) by at least 0.5 dB. In the range of 8.2 dB~9.3 dB, the PAPR for tone reservation (plots 1808, 1828) may be even better than the PAPR of VHT-SIGA1 when GID bits are flipped (plots 1806, 1826 in FIG. 22A and FIG. 22C, respectively).

Figure 18D:
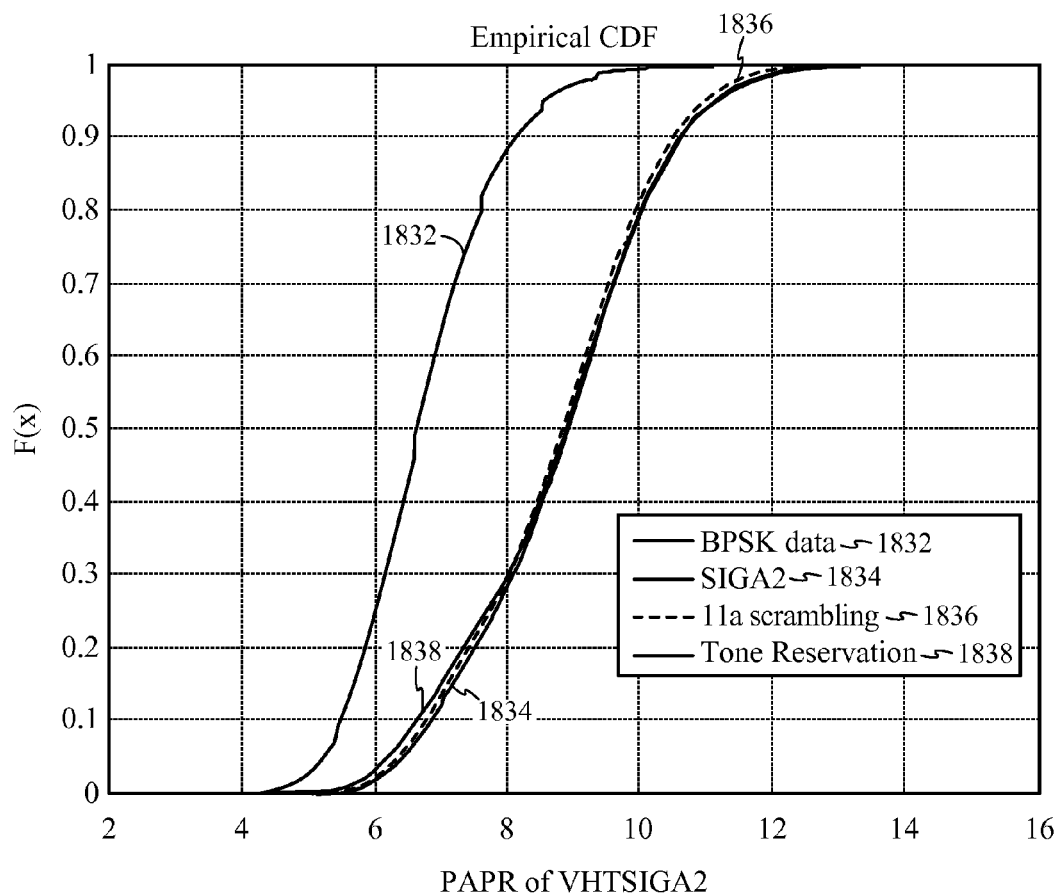

FIG. 18B and FIG. 18D illustrates example PAPR results of VHT-SIGA2 for GID/AID=0 and GID being random, respectively in accordance with certain aspects of the present disclosure. Since the reserved bits are optimized for PAPR of VHT-SIGA1 and not for VHT-SIGA2, PAPR results for tone reservation (plots 1818, 1838) are only slightly better than PAPR results for the original VHT-SIGA2 (plots 1814, 1834). The PAPR results illustrated in FIGS. 18A-18D are for SU transmission and AID being all zeros.

The example results from FIGS. 18A-18D may be summarized as follows.

In case of GID=0 and AID=0, a current VHT-SIGA1 has medium PAPR higher than BPSK data, and VHT-SIGA2 is worse than data. For VHT-SIGA1, inverting the GID field may improve PAPR of VHT-SIG-A1. Changing the location of the reserved bits in VHT-SIGA1 may make PAPR worse. Changing the values of the reserved bits in VHT-SIGA1 may make PAPR worse. For VHT_SIGA2, inverting SGI, coding, SU BF fields may not be substantially helpful to PAPR statistics. Changing the location/value of the reserved bit in VHT-SIGA2 may not make a substantial difference.

In case of GID being random, current VHT-SIGA1 may have medium PAPR higher than BPSK data, and VHT-SIGA2 may have PAPR worse than data. For VHT-SIGA1, inverting GID may not make a substantial difference in PAPR statistics. For VHT-SIGA2, changing the location of the reserved 6 bits in VHT-SIGA2 may make PAPR slightly worse.

According to certain aspects, making an SU Group ID=111111, instead of all 0s may make a noticeable difference.

Figure 19A:
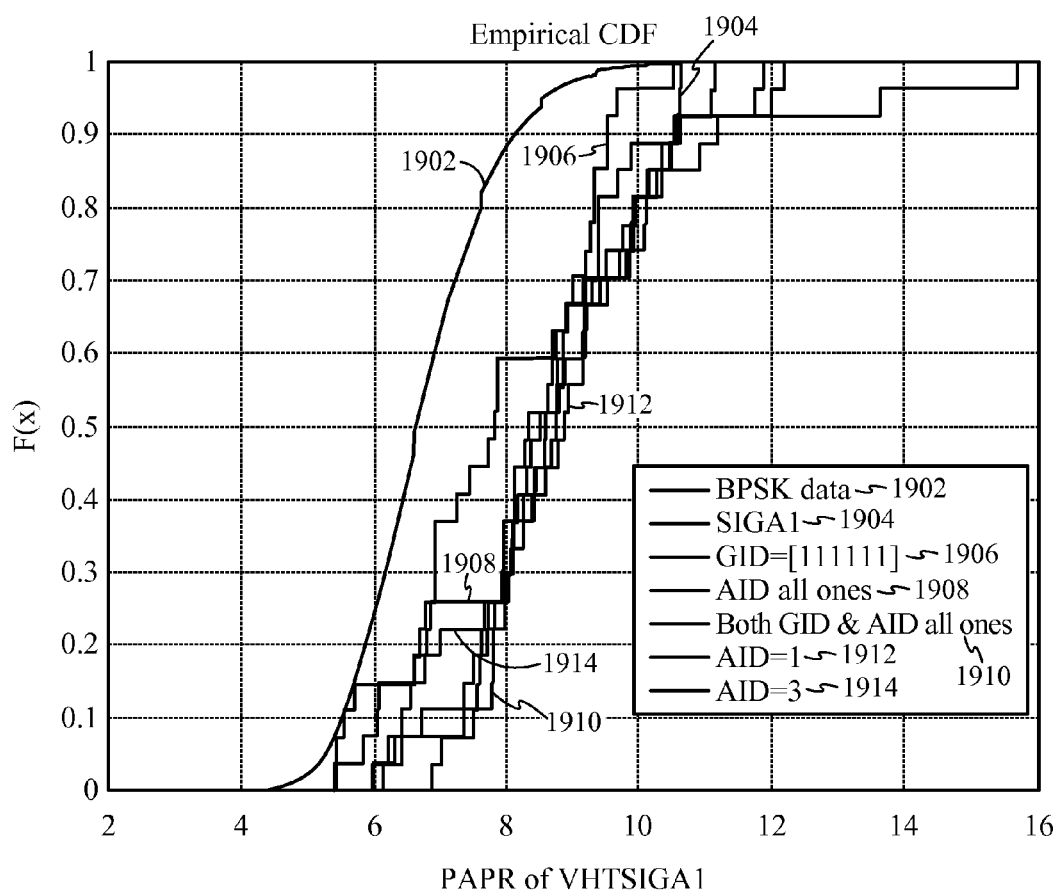
FIGS. 19A-19B illustrate example PAPR results of VHT-SIGA1 and VHT-SIGA2 fields in accordance with certain aspects of the present disclosure for Single-User (SU) communication in accordance with certain aspects of the present disclosure.
Figure 19B:
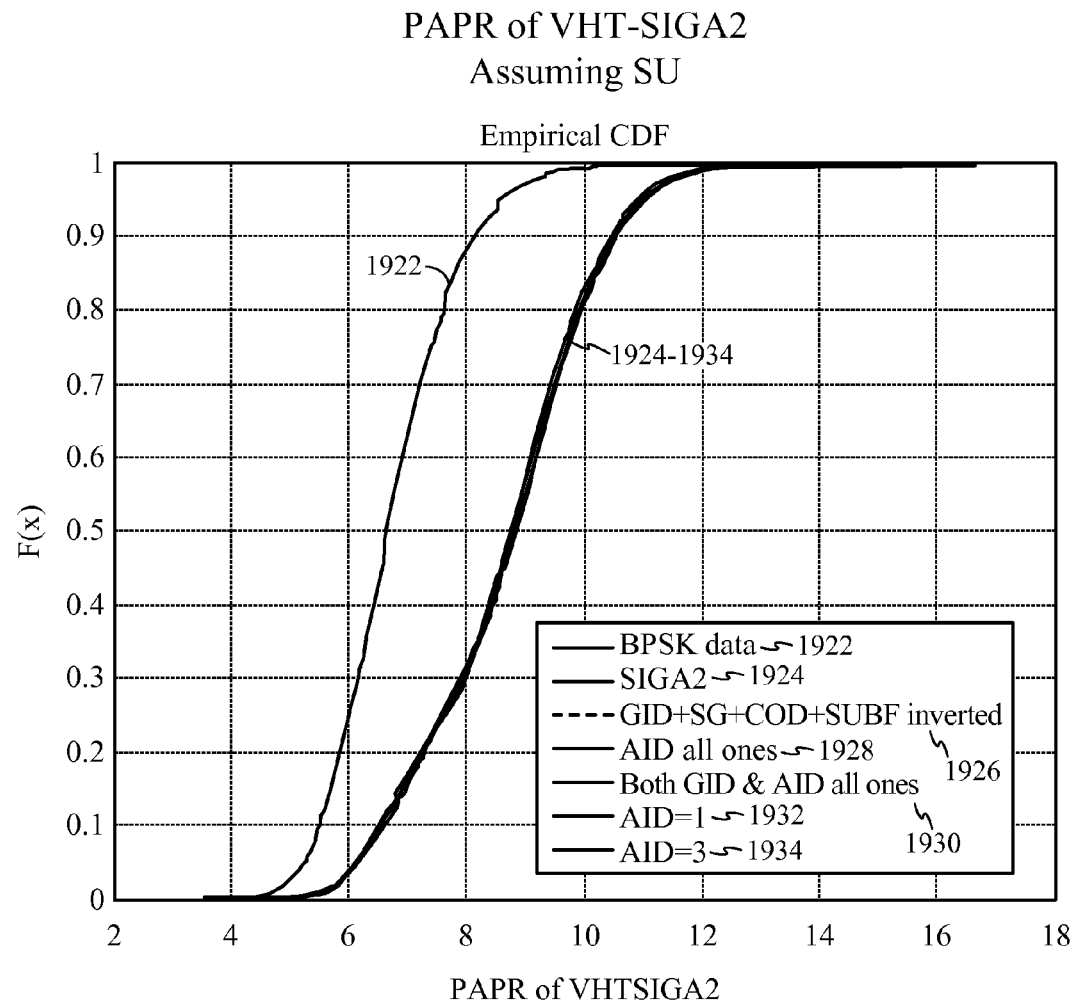

FIGS. 19A-19B illustrate example PAPR results of VHT-SIGA1 and VHT-SIGA2 fields respectively in accordance with certain aspects of the present disclosure for SU communication in accordance with certain aspects of the present disclosure. It can be assumed that AID may be all ones for uplink (UL) transmission, or AID may be equal to 1 or 3 (which may often happen in practice).

In FIG. 19A, PAPR cumulative density function (CDF) results of SU transmission of VHT-SIGA2 compare the case when GID is all ones (plot 1906) versus the case when AID is all ones (plot 1908) versus the case when both GID and AID are all ones (plot 1910) versus the case when AID=1 (plot 1912) versus the case when AID=3 (plot 1914), with baseline PAPR results from BPSK data (plot 1902) and originally proposed VHT-SIGA1 (plot 1904). It can be observed that with AID being all ones (plot 1908), the CDF is almost the same as the baseline PAPR result for the original VHT-SIGA1 (plot 1904). This is why the flipping of AID was not recommended before. However, with both GID and AID being all ones (plot 1910), the PAPR is getting worse, especially high PAPR values may occur more frequently. The case when AID=1 (plot 1912 in FIG. 19A) or AID=3 (plot 1914 in FIG. 19A) does not make much difference from the baseline PAPR result for the original VHT-SIGA1 (plot 1904 in FIG. 19A). As illustrated in FIG. 19B, all these different cases provide similar PAPR results for VHT-SIGA2.

Scrambling of all VHT-SIG Bits

A transmitter side (e.g., an access point) may be configured to perform scrambling of VHT-SIG field before transmission to minimize (or at least reduce) the PAPR of transmitted VHT-SIG field. In an aspect of the present disclosure, the scrambling may comprise: scrambling all bits of the VHT-SIG field with one of a plurality of scrambling sequences (e.g., one of four scrambling sequences), and including an identifier (ID) of that scrambling sequence in RESERVED bits of the VHT-SIG field. The plurality of scrambling sequences may be determined in an effort to reduce PAPR of the transmitted VHT-SIG field, and that scrambling sequence may provide a smallest value for the PAPR among a plurality of values for the PAPR associated with the plurality of scrambling sequences.

A receiver side (e.g., an access terminal) may receive the VHT-SIG field with all bits scrambled prior to transmission of the VHT-SIG field using one of the plurality of scrambling sequences, wherein an ID of that scrambling sequence was included in RESERVED bits of the transmitted VHT-SIG field. In an aspect of the present disclosure, the receiver may determine that scrambling sequence based on the ID, and perform de-scrambling of the VHT-SIG field according to that scrambling sequence.

Figure 4A:
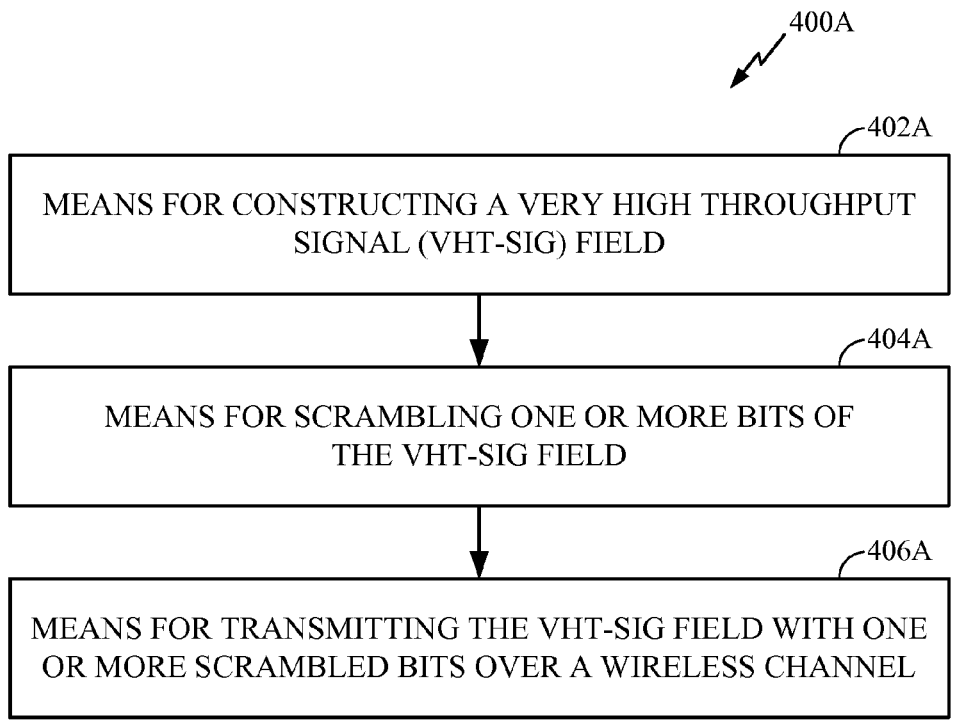
FIG. 4A illustrates example components capable of performing the operations illustrated in FIG. 4.
Figure 5A:
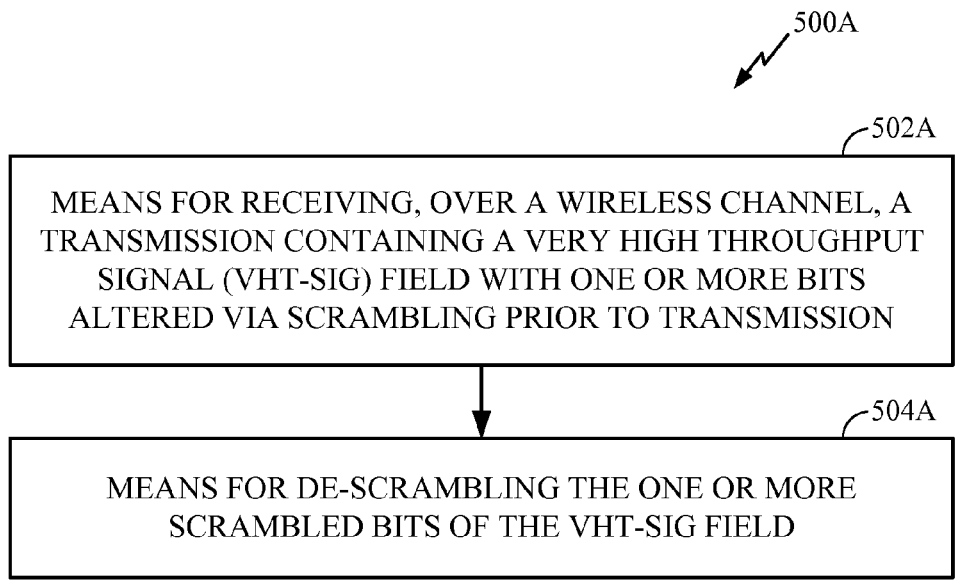
FIG. 5A illustrates example components capable of performing the operations illustrated in FIG. 5.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 400 and 500 illustrated in FIGS. 4 and 5 may correspond to components 400A and 500A illustrated in FIGS. 4A and 5A.

For example, the means for constructing may comprise an application specific integrated circuit, e.g., the TX data processor 202 of the wireless node 200 from FIG. 2, or the RX data processor 214 of the wireless node 200, or the processor 304 of the processing system 300 from FIG. 3. The means for scrambling may comprise an encoder, e.g., the TX data processor 202, or the processor 304. The means for transmitting may comprise a transmitter, e.g., the transceiver 206 of the wireless node 200 from FIG. 2. The means for inverting may comprise an application specific integrated circuit, e.g., the TX data processor 202, or the RX data processor 214 of the wireless node 200, or the processor 304. The means for computing may comprise an application specific integrated circuit, e.g., the TX data processor 202 o, or the RX data processor 214, or the processor 304. The means for inserting may comprise an application specific integrated circuit, e.g., the TX data processor 202, or the RX data processor 214, or the processor 304. The means for re-locating may comprise an application specific integrated circuit, e.g., the TX data processor 202, or the RX data processor 214, or the processor 304. The means for setting may comprise an application specific integrated circuit, e.g., the TX data processor 202, or the RX data processor 214, or the processor 304. The means for determining may comprise an application specific integrated circuit, e.g., the TX data processor 202, or the RX data processor 214, or the processor 304. The means for evaluating may comprise an application specific integrated circuit, e.g., the TX data processor 202, or the RX data processor 214, or the processor 304. The means for identifying may comprise an application specific integrated circuit, e.g., the TX data processor 202, or the RX data processor 214, or the processor 304. The means for receiving may comprise a receiver, e.g., the transceiver 206 of the wireless node 200 from FIG. 2. The means for de-scrambling may comprise a decoder, e.g., the RX data processor 214, or the processor 304. The means for calculating may comprise an application specific integrated circuit, e.g., the TX data processor 202, or the RX data processor 214, or the processor 304. The means for comparing may comprise an application specific integrated circuit, e.g., the TX data processor 202, or the RX data processor 214, or the processor 304. The means for signaling may comprise a transmitter, e.g., the transceiver 206 of the wireless node 200 from FIG. 2. The means for decoding may comprise a decoder, e.g., the RX data processor 214, or the processor 304. The means for identifying may comprise an application specific integrated circuit, e.g., the RX data processor 214, or the processor 304.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
   constructing a very high throughput signal (VHT-SIG) field;
   scrambling one or more bits of the VHT-SIG field, wherein the scrambling comprises relocating, within the VHT-SIG field, one or more reserved bits of the one or more bits, and wherein the scrambling further comprises:
      performing binary operation between the one or more bits of the VHT-SIG field and a sequence of bits, wherein the sequence of bits is determined in an effort to reduce peak-to-average power ratio (PAPR) of the VHT-SIG field; and
   transmitting the VHT-SIG field with one or more scrambled bits over a wireless channel.

2. The method of claim 1, wherein the scrambling is designed to reduce PAPR of the transmitted VHT-SIG field.

3. The method of claim 1, further comprising:
   performing the scrambling in response to determining expected PAPR of the transmitted VHT-SIG field exceeds a threshold value.

4. The method of claim 1, wherein the scrambling further comprises:
   inverting the value of one or more bits in the VHT-SIG field.

5. The method of claim 1, wherein the scrambling further comprises:
   setting an Association Identifier (AID) subfield of the VHT-SIG field to a value chosen from a set of one or more values, and wherein
   a Group Identifier (GID) subfield of the VHT-SIG field is set to a defined value indicating Single User (SU) transmission.

6. The method of claim 5, wherein the one or more values in the set are determined in an effort to reduce at least one of:
   a largest value among a plurality of values for PAPR of the transmitted VHT-SIG field,
   an average value of the plurality of values for PAPR of the transmitted VHT-SIG field, or
   a sum of the largest value and the average value.

7. An apparatus for wireless communications, comprising:
   means for constructing a very high throughput signal (VHT-SIG) field;
   means for scrambling one or more bits of the VHT-SIG field, wherein the means for scrambling comprises means for relocating, within the VHT-SIG field, one or more reserved bits of the one or more bits, wherein the means for scrambling further comprises means for performing binary operation between the one or more bits of the VHT-SIG field and a sequence of bits;

means for determining the sequence of bits in an effort to reduce peak-to-average power ratio (PAPR) of the VHT-SIG field; and means for transmitting the VHT-SIG field with one or more scrambled bits over a wireless channel.

8. The apparatus of claim 7, wherein the means for scrambling is designed to reduce PAPR of the transmitted VHT-SIG field.

9. The apparatus of claim 7, further comprising:
means for performing the scrambling in response to determining expected PAPR of the transmitted VHT-SIG field exceeds a threshold value.

10. The apparatus of claim 7, wherein the means for scrambling further comprises:
means for inverting the value of one or more bits in the VHT-SIG field.

11. The apparatus of claim 7, wherein the means for scrambling further comprises:
means for setting an Association Identifier (AID) subfield of the VHT-SIG field to a value chosen from a set of one or more values, and wherein
a Group Identifier (GID) subfield of the VHT-SIG field is set to a defined value indicating Single User (SU) transmission.

12. The apparatus of claim 11, wherein the one or more values in the set are determined in an effort to reduce at least one of:
a largest value among a plurality of values for PAPR of the transmitted VHT-SIG field,
an average value of the plurality of values for PAPR of the transmitted VHT-SIG field, or
a sum of the largest value and the average value.

13. An apparatus for wireless communications, comprising:
a circuit configured to construct a very high throughput signal (VHT-SIG) field;
an encoder configured to scramble one or more bits of the VHT-SIG field, wherein the encoder is configured to scramble by relocating, within the VHT-SIG field, one or more reserved bits of the one or more bits, and wherein the encoder is further configured to scramble by:
performing binary operation between the one or more bits of the VHT-SIG field and a sequence of bits, wherein the sequence of bits is determined in an effort to reduce peak-to-average power ratio (PAPR) of the VHT-SIG field; and
a transmitter configured to transmit the VHT-SIG field with one or more scrambled bits over a wireless channel.

14. A non-transitory computer readable medium containing executable instructions for wireless communications, the executable instructions comprising instructions for:
constructing a very high throughput signal (VHT-SIG) field;
scrambling one or more bits of the VHT-SIG field, wherein the scrambling comprises relocating, within the VHT-SIG field, one or more reserved bits of the one or more bits, wherein the scrambling further comprises:
performing binary operation between the one or more bits of the VHT-SIG field and a sequence of bits, wherein the sequence of bits is determined in an effort to reduce peak-to-average power ratio (PAPR) of the VHT-SIG field; and
transmitting the VHT-SIG field with one or more scrambled bits over a wireless channel.

15. An access point, comprising:
at least one antenna;
a circuit configured to construct a very high throughput signal (VHT-SIG) field;
an encoder configured to scramble one or more bits of the VHT-SIG field, wherein the encoder is configured to scramble by relocating, within the VHT-SIG field, one or more reserved bits of the one or more bits, and wherein the encoder is further configured to scramble by:
performing binary operation between the one or more bits of the VHT-SIG field and a sequence of bits, wherein the sequence of bits is determined in an effort to reduce peak-to-average power ratio (PAPR) of the VHT-SIG field; and
a transmitter configured to transmit via the at least one antenna the VHT-SIG field with one or more scrambled bits over a wireless channel.

16. A method for wireless communications, comprising:
receiving, over a wireless channel, a transmission containing a very high throughput signal (VHT-SIG) field with one or more bits altered via scrambling prior to transmission, wherein the scrambling comprises re-locating, within the VHT-SIG field, one or more reserved bits of the one or more bits, and wherein the scrambling further comprises performing binary operation between the one or more bits of the VHT-SIG field and a sequence of bits, wherein the sequence of bits is determined in an effort to reduce peak-to-average power ratio (PAPR) of the VHT-SIG field; and
de-scrambling the one or more scrambled bits of the VHT-SIG field.

17. The method of claim 16, wherein the scrambling is designed to reduce PAPR of the transmitted VHT-SIG field.

18. The method of claim 16, wherein the scrambling further comprises:
inverting the value of one or more bits in the VHT-SIG field.

19. The method of claim 16, wherein the scrambling further comprises:
setting values of GroupID bits of the VHT-SIG field to indicate Single User (SU) transmission, and the method further comprising
identifying the transmission as the SU transmission based on the values of GroupID bits.

20. The method of claim 16, wherein the scrambling further comprises:
setting an Association Identifier (AID) subfield of the transmitted VHT-SIG field to a value chosen from a set of one or more values, and wherein
a Group Identifier (GID) subfield of the VHT-SIG field is set to a defined value indicating Single User (SU) transmission.

21. The method of claim 20, wherein the one or more values in the set are determined in an effort to reduce at least one of:
a largest value among a plurality of values for PAPR of the transmitted VHT-SIG field,
an average value of the plurality of values for PAPR of the transmitted VHT-SIG field, or
a sum of the largest value and the average value.

22. The method of claim 16, further comprising:
setting an Association Identifier (AID) subfield of another VHT-SIG field to a value randomly chosen from a set of one or more values; and
transmitting the other VHT-SIG field.

23. An apparatus for wireless communications, comprising:
means for receiving, over a wireless channel, a transmission containing a very high throughput signal (VHT- SIG) field with one or more bits altered via scrambling prior to transmission, wherein the scrambling comprises re-locating, within the VHT-SIG field, one or more reserved bits of the one or more bits, and wherein the scrambling further comprises performing binary operation between the one or more bits of the VHT-SIG field and a sequence of bits, wherein the sequence of bits is determined in an effort to reduce peak-to-average power ratio (PAPR) of the VHT-SIG field; and means for de-scrambling the one or more scrambled bits of the VHT-SIG field.

24. The apparatus of claim 23, wherein the scrambling is designed to reduce PAPR of the transmitted VHT-SIG field.

25. The apparatus of claim 23, wherein the scrambling further comprises:

inverting the value of one or more bits in the VHT-SIG field.

26. The apparatus of claim 23, wherein the scrambling further comprises:

setting values of GroupID bits of the VHT-SIG field to indicate Single User (SU) transmission, and the apparatus further comprising identifying the transmission as the SU transmission based on the values of GroupID bits.

27. The apparatus of claim 23, wherein the scrambling further comprises:

setting an Association Identifier (AID) subfield of the transmitted VHT-SIG field to a value chosen from a set of one or more values, and wherein a Group Identifier (GID) subfield of the VHT-SIG field is set to a defined value indicating Single User (SU) transmission.

28. The apparatus of claim 27, wherein the one or more values in the set are determined in an effort to reduce at least one of:

a largest value among a plurality of values for PAPR of the transmitted VHT-SIG field, an average value of the plurality of values for PAPR of the transmitted VHT-SIG field, or a sum of the largest value and the average value.

29. The apparatus of claim 23, further comprising:

means for setting an Association Identifier (AID) subfield of another VHT-SIG field to a value randomly chosen from a set of one or more values; and means for transmitting the other VHT-SIG field.

30. An apparatus for wireless communications, comprising:

a receiver configured to receive, over a wireless channel, a transmission containing a very high throughput signal (VHT-SIG) field with one or more bits altered via scrambling prior to transmission, wherein the scrambling comprises re-locating, within the VHT-SIG field, one or more reserved bits of the one or more bits, and wherein the scrambling further comprises performing binary operation between the one or more bits of the VHT-SIG field and a sequence of bits, wherein the sequence of bits is determined in an effort to reduce peak-to-average power ratio (PAPR) of the VHT-SIG field; and a decoder configured to de-scramble the one or more scrambled bits of the VHT-SIG field scramble one or more bits of the VHT-SIG field.

31. A non-transitory computer readable medium containing executable instructions for wireless communications, the executable instructions comprising instructions for:

receiving, over a wireless channel, a transmission containing a very high throughput signal (VHT-SIG) field with one or more bits altered via scrambling prior to transmission, wherein the scrambling comprises re-locating, within the VHT-SIG field, one or more reserved bits of the one or more bits, and wherein the scrambling further comprises performing binary operation between the one or more bits of the VHT-SIG field and a sequence of bits, wherein the sequence of bits is determined in an effort to reduce peak-to-average power ratio (PAPR) of the VHT-SIG field; and de-scrambling the one or more scrambled bits of the VHT-SIG field.

32. An access terminal, comprising:

at least one antenna;

a receiver configured to receive, over a wireless channel via the at least one antenna, a transmission containing a very high throughput signal (VHT-SIG) field with one or more bits altered via scrambling prior to transmission, wherein the scrambling comprises re-locating, within the VHT-SIG field, one or more reserved bits of the one or more bits, and wherein the scrambling further comprises performing binary operation between the one or more bits of the VHT-SIG field and a sequence of bits, wherein the sequence of bits is determined in an effort to reduce peak-to-average power ratio (PAPR) of the VHT-SIG field; and a decoder configured to de-scramble the one or more scrambled bits of the VHT-SIG field scramble one or more bits of the VHT-SIG field.

33. The method of claim 1, wherein the scrambling comprises:

setting values of GroupID bits of the VHT-SIG field to indicate Single User (SU) transmission.

34. The apparatus of claim 7, wherein the means for scrambling comprises means for setting values of GroupID bits of the VHT-SIG field to indicate Single User (SU) transmission.

35. The method of claim 19, wherein setting the values of the GroupID bits of the VHT-SIG field to indicate a SU transmission comprises setting values of the Group ID bits to 111111.

36. The apparatus of claim 26, wherein setting the values of the GroupID bits of the VHT-SIG field to indicate a SU transmission comprises setting values of the Group ID bits to 111111.

37. The method of claim 1, wherein the scrambling further comprises selecting reserved bits using a lookup table.

38. A method for wireless communications, comprising:

constructing a signal field;

scrambling one or more bits of the signal field, wherein the scrambling comprises relocating, within the signal field, one or more reserved bits of the one or more bits, and wherein the scrambling further comprises:

performing binary operation between the one or more bits of the signal field and a sequence of bits, wherein the sequence of bits is determined in an effort to reduce peak-to-average power ratio (PAPR) of the signal field; and transmitting the signal field with one or more scrambled bits over a wireless channel.

39. The method of claim 38, wherein the scrambling further comprises selecting reserved bits using a lookup table.

40. A method for wireless communications, comprising:

receiving, over a wireless channel, a transmission containing a signal field with one or more bits altered via scrambling prior to transmission, wherein the scrambling comprises re-locating, within the signal field, one or more reserved bits of the one or more bits, and wherein the scrambling further comprises performing binary operation between the one or more bits of the signal field and a sequence of bits, wherein the sequence of bits is determined in an effort to reduce peak-to-average power ratio (PAPR) of the signal field; and de-scrambling the one or more scrambled bits of the signal field.

* * * * *